US011163952B2

(12) United States Patent
Gentile et al.

(10) Patent No.: US 11,163,952 B2
(45) Date of Patent: Nov. 2, 2021

(54) LINKED DATA SEEDED MULTI-LINGUAL LEXICON EXTRACTION

(71) Applicant: International Business Machines Corporation, Armonk, NY (US)

(72) Inventors: Anna Lisa Gentile, San Jose, CA (US); Daniel Gruhl, San Jose, CA (US); Petar Ristoski, San Jose, CA (US); Steven R. Welch, Gilroy, CA (US); Alfredo Alba, Morgan Hill, CA (US); Chris Kau, Mountain View, CA (US); Chad DeLuca, Morgan Hill, CA (US); Linda Kato, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 16/033,098

(22) Filed: Jul. 11, 2018

(65) Prior Publication Data
US 2020/0019608 A1 Jan. 16, 2020

(51) Int. Cl.
*G06F 40/284* (2020.01)
*G06K 9/62* (2006.01)
*G06F 40/216* (2020.01)
*G06F 40/242* (2020.01)

(52) U.S. Cl.
CPC .......... *G06F 40/284* (2020.01); *G06F 40/216* (2020.01); *G06F 40/242* (2020.01); *G06K 9/6256* (2013.01); *G06K 9/6263* (2013.01)

(58) Field of Classification Search
None
See application file for complete search history.

(56) References Cited

U.S. PATENT DOCUMENTS

| | | |
|---|---|---|
| 6,978,274 B1 | 12/2005 | Gallivan et al. |
| 7,251,637 B1 * | 7/2007 | Caid ..................... G06K 9/4623 706/15 |
| 8,612,203 B2 | 12/2013 | Foster et al. |
| 8,640,017 B1 | 1/2014 | Chang et al. |
| 8,682,674 B1 | 3/2014 | Komissarchik et al. |
| 8,892,550 B2 | 11/2014 | Chu-Carroll et al. |
| 9,070,366 B1 * | 6/2015 | Mathias .................. G10L 15/26 |
| 9,146,985 B2 * | 9/2015 | Carter ................. G06F 16/3334 |
| 9,348,806 B2 | 5/2016 | Clarkson et al. |

(Continued)

OTHER PUBLICATIONS

Mironczuk, M. et al.; "Language-Independent Information Extraction Based on Formal Concept Analysis", ICIA/IEEE 2nd International Conf. on, Sep. 23-25, 2013, pp. 323-329, United States.

(Continued)

Primary Examiner — Neeraj Sharma
(74) Attorney, Agent, or Firm — Sherman IP LLP; Kenneth L. Sherman; Steven Laut

(57) ABSTRACT

One embodiment provides a method for relevant language-independent terminology extraction from content, the method including extracting lexicon items from the content based on context extraction patterns using statistical processing. Feedback on the extracted lexicon items is received to automatically tune scores and thresholds for the context extraction patterns. Available Linked Data is leveraged for a bootstrap source. The relevant language-independent terminology extraction is bootstrapped using the bootstrap source.

20 Claims, 20 Drawing Sheets

(56) References Cited

U.S. PATENT DOCUMENTS

| | | | |
|---|---|---|---|
| 9,563,644 B1 | 2/2017 | Castillo et al. | |
| 9,633,005 B2 | 4/2017 | Danielyan et al. | |
| 9,922,029 B1* | 3/2018 | Zhang | G06F 40/253 |
| 10,713,485 B2* | 7/2020 | Ekambaram | G06T 19/006 |
| 2005/0149496 A1* | 7/2005 | Mukherjee | G06F 16/24575 |
| 2006/0009963 A1 | 1/2006 | Gaussier et al. | |
| 2009/0182728 A1* | 7/2009 | Anderson | G06F 16/90344 |
| 2009/0319449 A1* | 12/2009 | Gamon | G06F 16/94 706/12 |
| 2010/0082331 A1 | 4/2010 | Brun et al. | |
| 2010/0082333 A1* | 4/2010 | Al-Shammari | G06F 40/242 704/10 |
| 2010/0138211 A1 | 6/2010 | Shi et al. | |
| 2011/0093467 A1* | 4/2011 | Sharp | G06F 40/151 707/741 |
| 2011/0196737 A1* | 8/2011 | Vadlamani | G06Q 30/02 705/14.49 |
| 2012/0117455 A1* | 5/2012 | Fogel | G06Q 10/0633 715/221 |
| 2012/0158633 A1* | 6/2012 | Eder | G16H 15/00 706/46 |
| 2012/0158703 A1 | 6/2012 | Li et al. | |
| 2012/0303359 A1* | 11/2012 | Mizuguchi | G06F 16/353 704/10 |
| 2013/0212060 A1* | 8/2013 | Crouse | G06F 16/93 707/602 |
| 2014/0075004 A1* | 3/2014 | Van Dusen | G06F 16/90335 709/223 |
| 2014/0193794 A1* | 7/2014 | Olander, III | G09B 7/06 434/362 |
| 2014/0046977 A1 | 12/2014 | Gopalakrishnan et al. | |
| 2014/0358523 A1* | 12/2014 | Sheth | G06F 40/30 704/9 |
| 2015/0081711 A1* | 3/2015 | Harris | G06F 16/367 707/737 |
| 2015/0127319 A1* | 5/2015 | Hwang | G06F 40/40 704/2 |
| 2015/0178270 A1 | 6/2015 | Zuev et al. | |
| 2015/0186504 A1* | 7/2015 | Gorman | G06F 40/30 707/752 |
| 2015/0278199 A1* | 10/2015 | Hazen | G06F 40/40 704/9 |
| 2015/0363485 A1* | 12/2015 | Bennett | G06F 16/3338 707/694 |
| 2016/0117386 A1 | 4/2016 | Ajmera et al. | |
| 2016/0170968 A1 | 6/2016 | Allen et al. | |
| 2016/0179783 A1 | 6/2016 | Boguraev et al. | |
| 2016/0225372 A1* | 8/2016 | Cheung | G10L 15/22 |
| 2017/0052950 A1 | 2/2017 | Danielyan et al. | |
| 2017/0192955 A1* | 7/2017 | Zeichner | G06F 40/211 |
| 2018/0137775 A1* | 5/2018 | Byron | G09B 19/0092 |
| 2018/0285352 A1* | 10/2018 | Ma | G06F 40/42 |
| 2018/0307993 A1* | 10/2018 | Chawla | G06F 16/9535 |

OTHER PUBLICATIONS

Olteanu, A. et al.; "CrisisLex: A Lexicon for Collecting and Filtering Microblogged Communications in Crises", Weblogs and Social Media, 8th AAAI Inter. Conf. on, Jun. 2014, pp. 376-385, United States.

Perera, R. et al.; "A Multi-Strategy Approach for Lexicalizing Linked Open Data", CICLing 2015, Part II, LNCS 9042, Apr. 2015, pp. 348-363, United States.

Formiga, L. et al.; "Leveraging Online User Feedback to Improve Statistical Machine Translation", Journal of Artificial Intelligent Research, Sep. 2015, pp. 159-192, vol. 54, Iss. 1, AI Access Foundation, United States.

Sahlgrenand, M. et al., "Automatic bilingual lexicon acquisition using random indexing of parallel corpora.", Nat. Lang. Engineering, 11(3):327-341, Sep. 2005, Cambridge University Press, United Kingdom.

Pappu, A., et al., "Lightweight multilingual entity extraction and linking," In Proceedings of the Tenth ACM International Conference on Web Search and Data Mining, WSDM '17, 2017, pp. 365-374, ACM, New York, NY.

Abacha, A.B. et al., "Text mining for pharmacovigilance: Using machine learning for drug name recognition and drug-drug interaction extraction and classification," Journal of Biomedical Informatics, Sep. 2015, pp. 122-132, (58) Elsevier, Inc., United States.

Lee, K. et al, "Adverse Drug Event Detection in Tweets with Semi-Supervised Convolutional Neural Networks," International World Wide Web Conference Committee Apr. 2017, pp. 705-714, Creative Commons, Perth, Australia.

Hamilton, W.L, et al. "Inducing domain-specific sentiment lexicons from unlabeled corpora," In Proceedings of the 2016 Conference on Empirical Methods in Natural Language Processing, Nov. 2016, pp. 1-19, Association for Computational Linguistics, Austin, Texas.

Dolby, J., et al, "Generating Domain-Specific Dictionaries using Bayesian Learning," Ecis, 2015 p. 0-14, 2015, Munster, Germany.

Mitzias, P. et al., "User-driven ontology population from linked data sources," In International Conference on Knowledge Engineering and the Semantic Web, 2016, pp. 31-41, Springer, United States.

Gentile, A.L. et al, "Unsupervised wrapper induction using linked data," In Proceedings of the Seventh International Conference on Knowledge Capture, K-CAP '13, Jun. 2013, pp. 41-48, ACM, New York, NY.

Mell, P., et al., "The NIST Definition of Cloud Computing", National Institute of Standards and Technology Special Publication 800-145, Sep. 2011, pp. 1-7, U.S. Department of Commerce, United States.

{Grace Period Disclosure}: Alba, A. et al., "Multi-lingual Concept Extraction with Linked Data and Human-in-the-Loop," K-CAP 2017, Dec. 4-6, 2017, Austin, TX, USA.

{Grace Period Disclosure}: Alba, A. et al., "Language Agnostic Dictionary Extraction," In ISWC (ISWC-PD-Industry), CEUR Workshop Proceedings, Oct. 21, 2017, pp. 1-4, vol. 1963, United States.

* cited by examiner

LINKED DATA SEEDED MULTI-LINGUAL LEXICON EXTRACTION

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): (1) "Multi-lingual Concept Extraction with Linked Data and Human-in-the-Loop," by Alfredo Alba, Anni Coden, Anna Lisa Gentile, Daniel Gruhl, Petar Ristoski, Steve Welch, published Dec. 4, 2017 in Proceedings of the Knowledge Capture Conference, Article 24, pp. 1-14, Austin, Tex., United States; (2) "Language Agnostic Dictionary Extraction," by Alfredo Alba, Anni Coden, Anna Lisa Gentile, Daniel Gruhl, Petar Ristoski, Steve Welch, published Oct. 21, 2017, pp. 1-4, In ISWC (ISWC-PD-Industry), CEUR Workshop Proceedings, vol. 1963.

BACKGROUND

Currently, there are several existing solutions to extract relevant terminology or lexica from both unstructured text and semi-structured content. For many tasks, fully automated approaches are not effective, mainly due to the negative effect of semantic drift. Moreover, the majority of information extraction techniques are language dependent, i.e. they rely on Natural Language Processing (NLP) operations and tools that are language specific, such as parsing, part of speech tagging, etc.

SUMMARY

Embodiments relate to using Linked Data to seed a multi-lingual lexicon extraction. One embodiment provides for a method for relevant language-independent terminology extraction from content. The method includes extracting lexicon items from the content based on context extraction patterns using statistical processing. Feedback on the extracted lexicon items is received to automatically tune scores and thresholds for the context extraction patterns. Available Linked Data is leveraged for a bootstrap source. The relevant language-independent terminology extraction is bootstrapped using the bootstrap source.

These and other features, aspects and advantages of the present invention will become understood with reference to the following description, appended claims and accompanying figures.

BRIEF DESCRIPTION OF THE DRAWINGS

FIG. 10B shows the comparison of recall between glimpse (completely manually seeded) and glimpseLD (Linked Data seeded), according to one embodiment;

DETAILED DESCRIPTION

Figure 1:
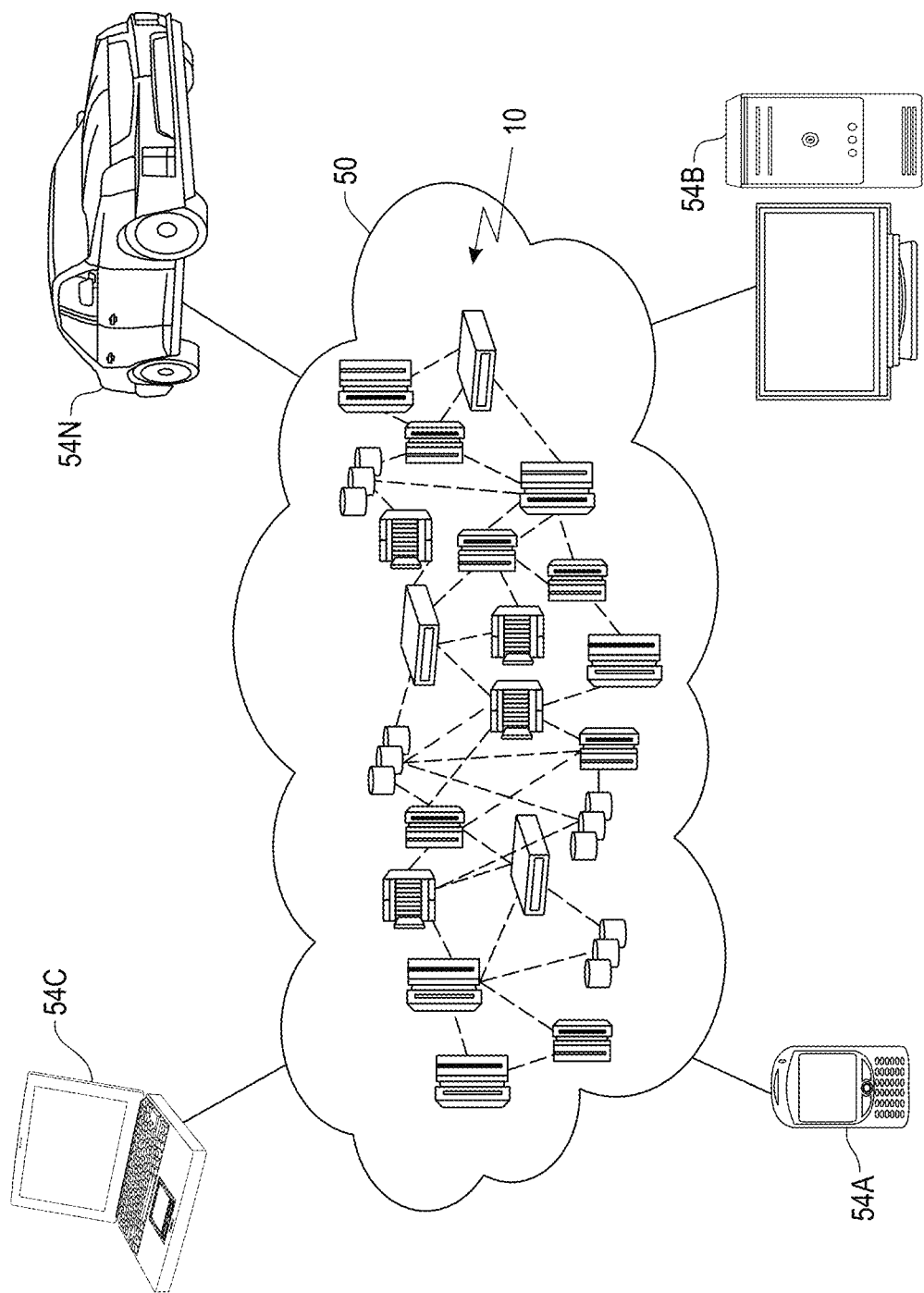
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Embodiments relate to using Linked Data to seed a multi-lingual lexicon extraction. One embodiment provides a method for relevant language-independent terminology extraction from content. The method includes extracting lexicon items from the content based on context extraction patterns using statistical processing. Feedback on the extracted lexicon items is received to automatically tune scores and thresholds for the context extraction patterns. Available Linked Data is leveraged for a bootstrap source. The relevant language-independent terminology extraction is bootstrapped using the bootstrap source.

One embodiment provides a solution for extracting relevant terminology or lexica from both unstructured text and semi-structured content that provides Linked Data seeded multi-lingual lexicon extraction (referred to herein as glimpseLD) that revolves around three main aspects: (i) glimpseLD includes a statistical process which extracts lexicon items based on context patterns; (ii) glimpseLD relies on receiving human feedback on the extracted lexicon items to automatically tune scores and thresholds for the extraction patterns; (iii) and glimpseLD leverages any available Linked Data (even in small quantities) to bootstrap the process. In computing, Linked Data may encompass a process of publishing structured data such that it may be interlinked and become more useful through semantic queries. Linked Data builds upon standard Internet technologies such as HTTP, RDF and URIs, but uses these to share information in a way that may be read automatically by computers.

Ontologies are dynamic artifacts that evolve both in structure and content. Keeping ontologies up-to-date is a very expensive and critical operation for any application relying on semantic Web technologies. One embodiment focuses on evolving the content of an ontology by extracting relevant instances of ontological concepts from text. One embodiment includes processing that is (i) completely language independent, (ii) combines statistical methods with human-in-the-loop and (iii) exploits Linked Data as a bootstrapping source. One embodiment achieves comparable performances regardless of language, domain and style of text. Given that the glimpseLD processing relies on receiving information from a human-in-the-loop, the results may be safely fed directly back into Linked Data resources.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
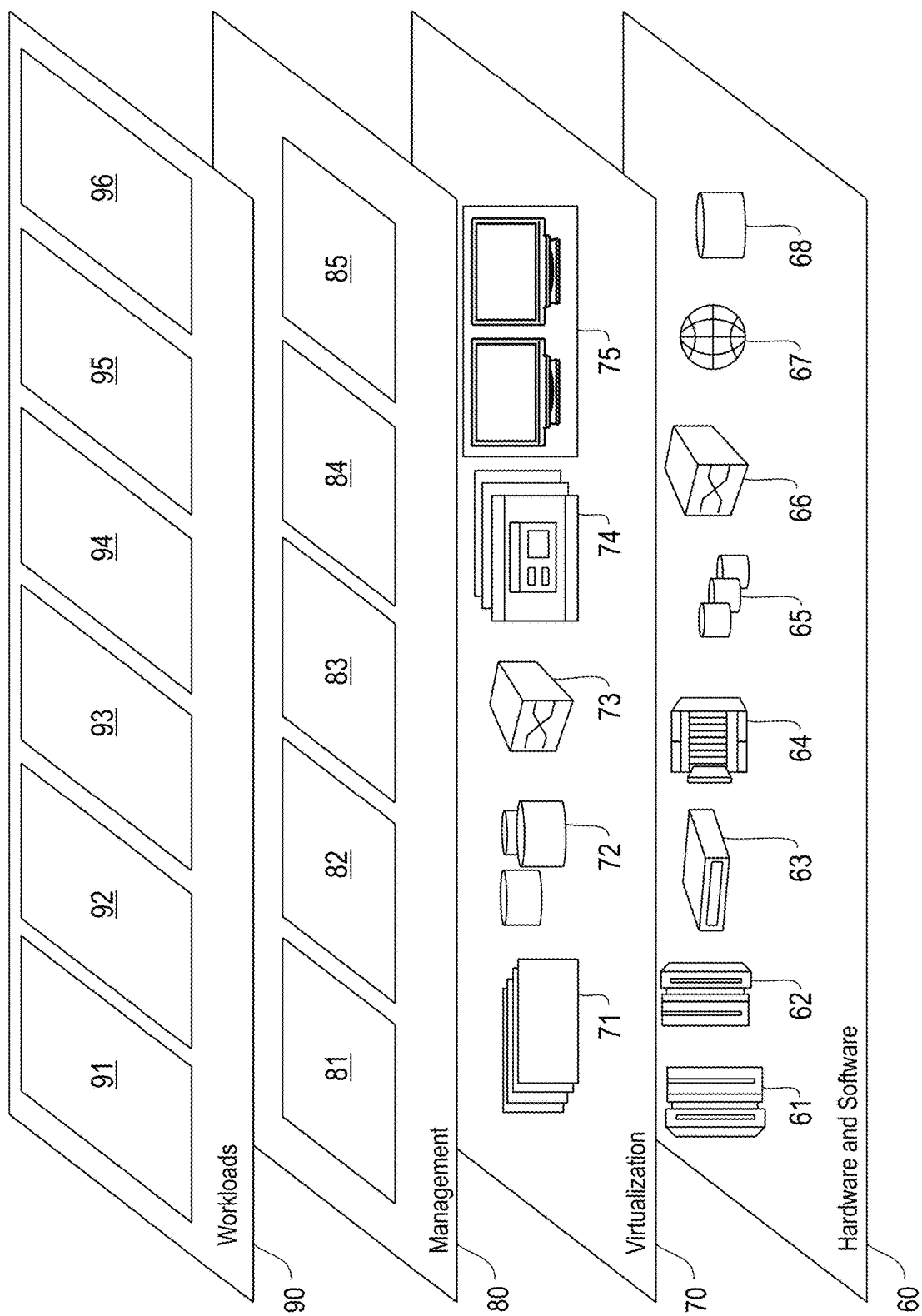
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Linked Data seeded multi-lingual lexicon extraction processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
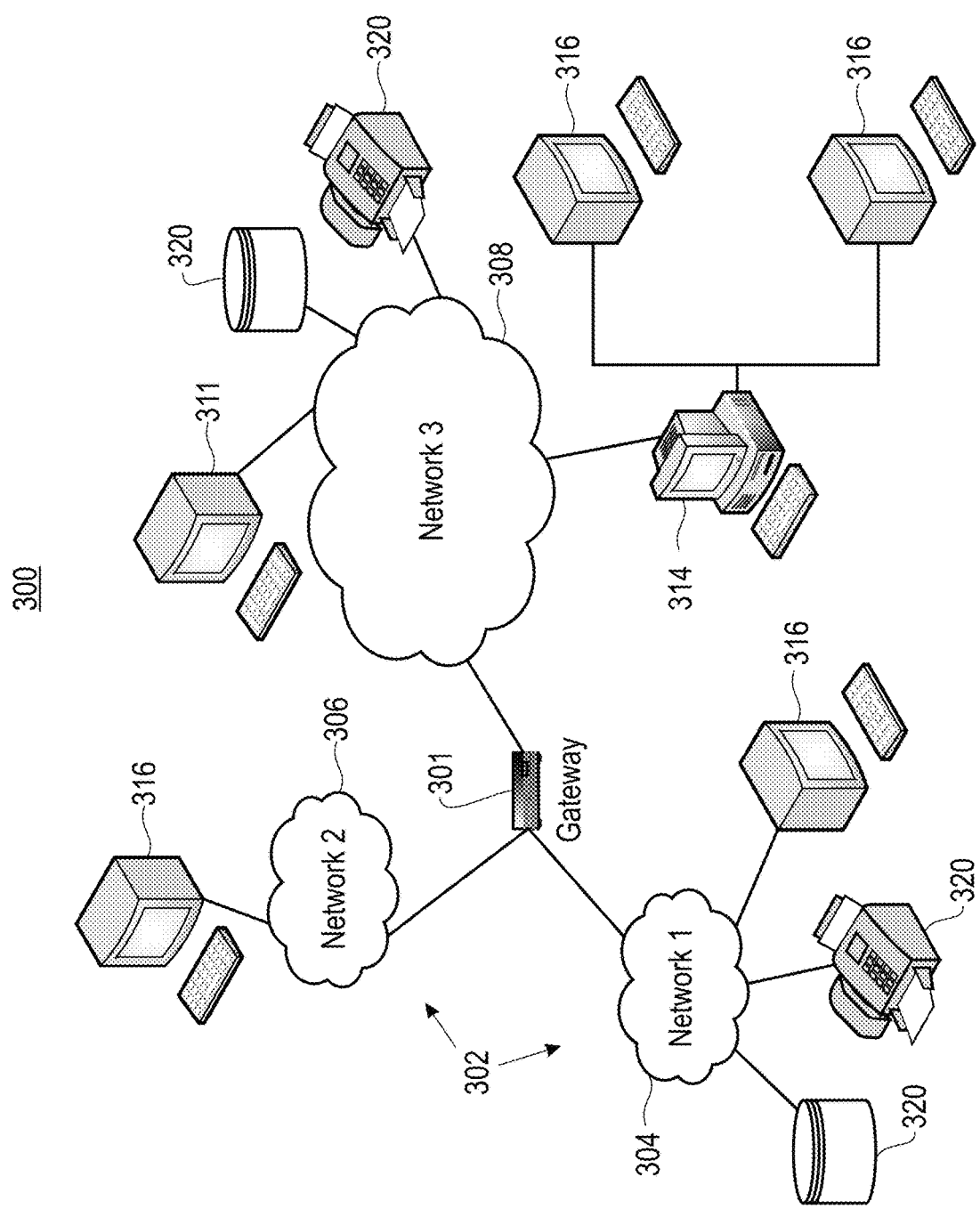
FIG. 3 is a network architecture for using Linked Data to seed a multi-lingual lexicon extraction process, according to an embodiment.

FIG. 3 illustrates a network architecture 300 for Linked Data seeded multi-lingual lexicon extraction processing, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
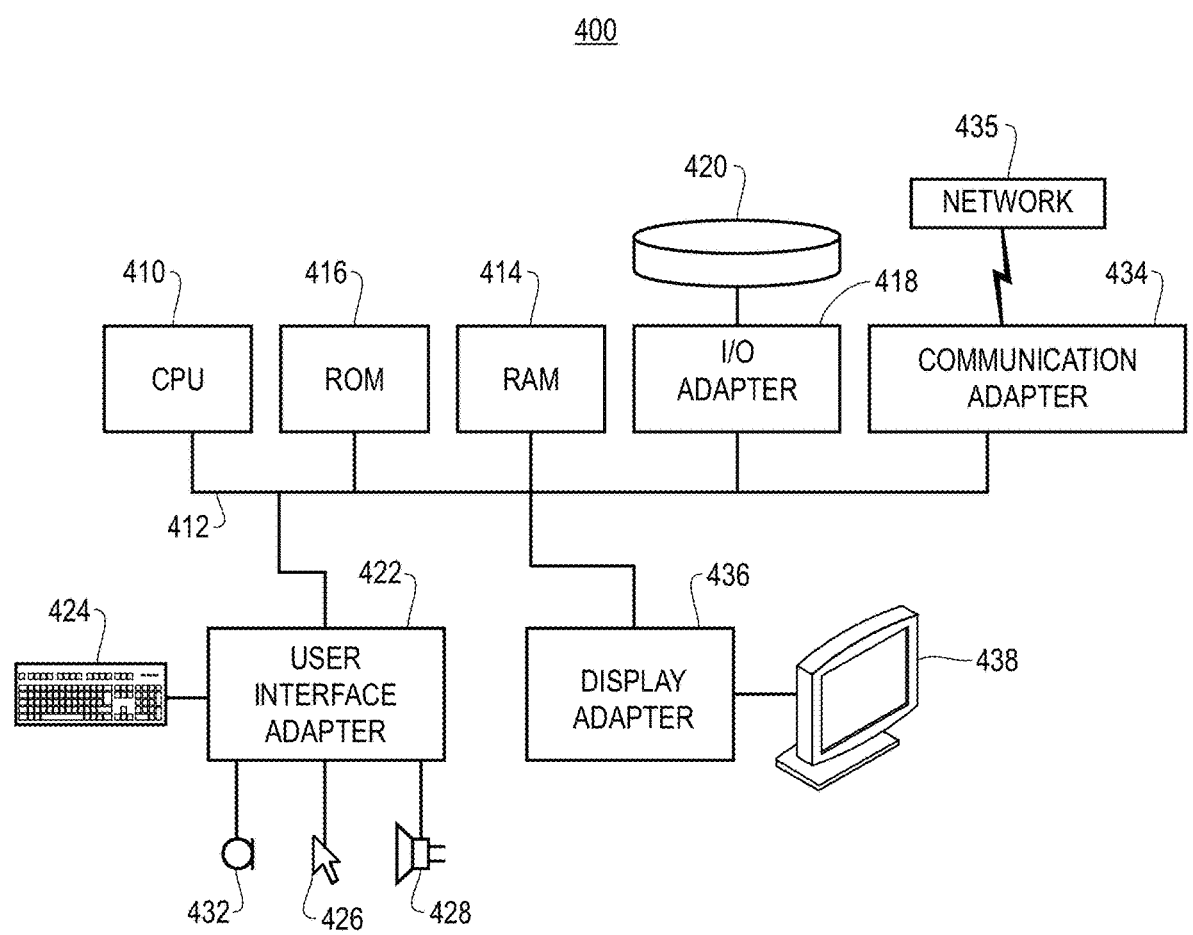
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
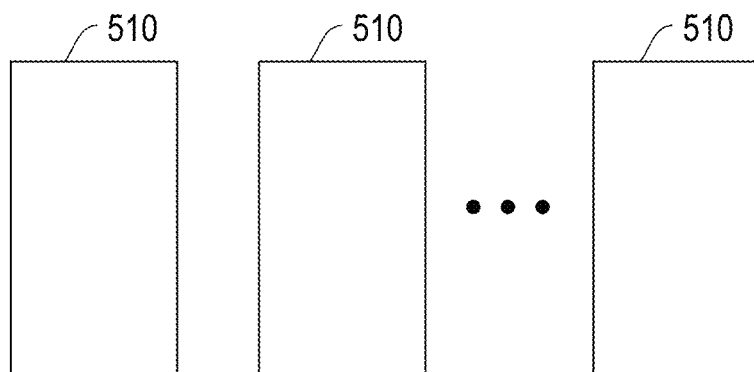
FIG. 5 is a block diagram illustrating a distributed system for use of Linked Data to seed multi-lingual lexicon extraction processing, according to one embodiment.
Figure 5:
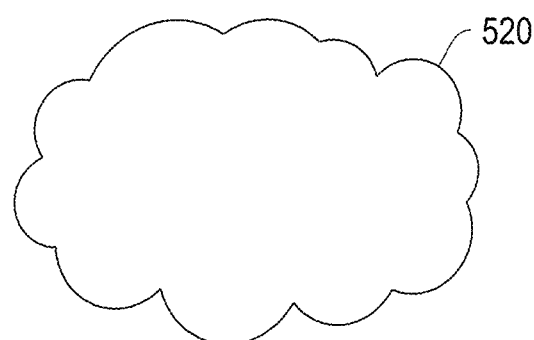
Figure 5:
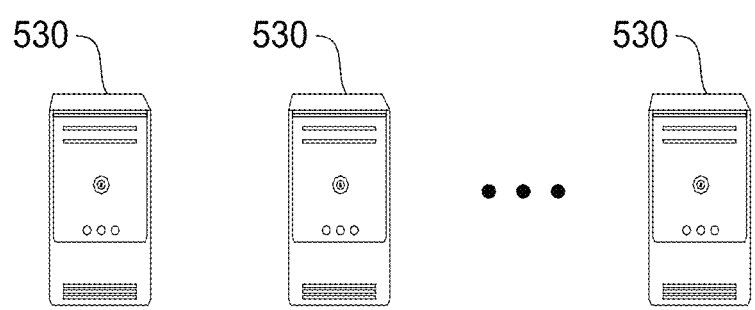

FIG. 5 is a block diagram illustrating a system 500 that may be employed for Linked Data seeded multi-lingual lexicon extraction processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a datacenter, etc.), and servers 530. In one embodiment, the client devices are provided with cloud services from the servers 530 through the cloud or resource sharing environment 520.

In one embodiment, system 500 provides Linked Data seeded multi-lingual lexicon extraction processing that is completely language independent, making it appealing for many "resource poor" languages, where off-the-shelf tools are often not available. In one embodiment, the processing provided by system 500 uses any available Linked Data to seed an extraction process. For the processing provided by system 500, the choice of initial seeds have little impact on the performance, and therefore may be randomly selected from any available linked dataset. While a subject matter expert can still provide initial seed(s) for the processing, Linked Data is used to suggest further candidates to the user, speeding up the hurdle of initial iterations. The processing provided by system 500 significantly speeds up the lexicon discovery process. The processing is also robust with respect to different text styles. One advantage of the processing provided by system 500 is that it is fully independent with respect to language, domain and language style of the corpus. In one embodiment, the human-in-the-loop has the power to drive the extraction of concepts towards their semantic interpretation while Linked Data serves as a powerful bootstrapping tool, enabling the extraction of lexicon in any language in a very limited time.

In one embodiment, the processing provided by system 500 identifies language independent context patterns in text to extract a desired lexicon from the data. In one embodiment, one of the key features of the processing provided by system 500 is exploiting knowledge obtained from Linked Data combined with having human-in-the-loop, assuring a back and forward feedback loop. Starting with a minimal number of relevant seed phrases system 500 identifies occurrences in a relevant corpus and learns their context patterns. Linked Data is sued to gather initial seeds and identified patterns are used to extract new lexicon items. In one embodiment, the processing provided by system 500 includes a statistical process for lexicon extraction that exploits language independent context patterns. The input is a large text corpus whose content is relevant to the domain of the lexicon to be extracted. For example, one would choose a corpus of medical documents to find drugs or a general corpus (e.g., content from TWITTER®) to find colors. Besides the corpus, in the processing provided by system 500, glimpseLD needs one or more example (seeds) of the lexicon items to extract. Starting from these, the processing provided by system 500 evaluates the contexts (the set of words surrounding an item) in which the seeds occur and identifies "good" contexts. Contexts are scored retrospectively in terms of how many "good" results they generate. All contexts are kept which score over a given clip level and the candidates that appear in the most "good" contexts are provided first. "Good" contexts are used to identify further terms or phrases in the corpus: these are presented to a human as new lexicon candidates—the ones accepted by the subject expert are (i) added to the lexicon and (ii) used as additional seeds for the next iteration. The processing provided by system 500 also learns from the rejected items—their contexts are down voted as "not good." The steps of finding new "good" contexts and additional candidate terms are repeated until some threshold (i.e., saturation) is achieved and/or no new terms are found. The processing provided by system 500 uses knowledge from Linked Data to bootstrap the processing. In one embodiment, the processing is seeded with initial seed terms of the same type as the desired lexicon from Linked Data. Increasing the number of initial and relevant seed terms significantly improves the effectiveness and efficiency of the processing (i.e., providing the processing to extract a higher number of terms in the corpus in fewer human iterations).

By their very nature real world ontologies are dynamic artifacts, and ontology evolution poses major challenges for all applications that rely on semantic Web technologies. Ontologies evolve both in their structure (the data model) and their content (instances), and keeping them up-to-date can be quite expensive. In one embodiment, the processing provided by system 500 provides a computer/human partnership to more rapidly evolve the content of an ontology through extraction of new relevant concepts from text. The atomic operation behind this population step is the discovery of all instances that belong to each concept. A plethora of solutions have been proposed to extract relevant terminology or dictionaries from both unstructured text and semi-structured content. The need to constantly update ontologies, dictionaries and terminologies is well known. As a motivating example, online shops must integrate new product descriptions provided by vendors on a daily basis. The features and vocabulary used to describe the products continuously evolve, with different vendors providing the product descriptions in varied writing styles and standards. Despite these differences, to fully integrate new products (e.g., be able to provide meaningful "comparison shopping" grids), merchants must correctly identify and assign equivalences to all these instances. As another example consider medical surveillance. Medical reports need to be scanned for clinical issues, for example for adverse drug reactions, which might be caused by prescription drugs. New drugs are constantly approved and available on the market, therefore using an obsolete drug dictionary to identify them would miss all new products. These are, coincidentally, some of the most important to surveil. Another source of valuable information in terms of pharma-covigilance is user-generated content, for example focused online communities or general communities such as TWITTER®, where drugs, symptoms and reactions are expressed in many varied ways by different users. The evolution of dictionaries is not confined to products (or other naturally growing sets). Even concepts that we would assume as simple and stable, for example color names, are constantly evolving. The way color names change in different languages can be quite dissimilar, given the cultural differences in how people express them in different countries. For instance, a new color name, mizu, has recently been proposed for addition in the list of Japanese basic color terms. On a more practical level, capturing the right instances for a concept can also be highly task-dependent: for example, "space gray," "matte black" and "jet black" are all relevant colors for mobile phones, while "white chocolate" or "amber rose" are colors of wall paint products.

In one embodiment, the processing provided by system 500, statistical processing (referred to herein as "glimpse") for dictionary extraction takes as input a large text corpus whose content is relevant to the domain of the concept to be extracted. For example, one would choose a corpus of medical documents to find drugs or a general corpus (e.g., content from TWITTER®) to find colors. Besides the corpus, glimpse needs one or more examples (seeds) of the concept instances to extract. Starting from these, the processing provided by system 500 evaluates the contexts (the set of words surrounding an item) in which the seeds occur and identifies "good" contexts. Contexts are scored retrospectively in terms of how many "good" results they generate. All contexts are kept which score over a given clip level and the candidates that appear in the most "good" contexts are provided first. "Good" contexts are used to identify further terms or phrases in the corpus: these are presented to a human as new concept candidates—the ones accepted by the subject expert are (i) added to the dictionary and (ii) used as additional seeds for the next iteration. The processing provided by system 500 also learns from the rejected items—their contexts are down voted as "not good." The steps of finding new good contexts and additional candidate terms are repeated until some threshold (i.e., saturation) is achieved and/or no new terms are found.

In one embodiment, a human-in-the-loop model is quite conducive to many "real-world" scenarios. However, it is expensive to evaluate the operation of processing across many different languages, semantic contexts and types of text, as many gold-standard corpora would need to be created. Towards this end an automatic evaluation process which shows the "discovery growth" of dictionary items as a function of the number of iterations is provided according to one embodiment; this is a good approximation to the real world problem of finding concept surface forms: in a real scenario—where no gold standard is available, but the correctness of extraction is assured by human-in-the-loop—the ratio of new correct terms added at each iteration is a useful indication of performance. In a large enough corpus (e.g., TWITTER®) there is not and cannot be a complete "gold standard" as language is always evolving. The best bet is to rapidly grow a dictionary to capture the new terms as they emerge.

In one embodiment, the processing provided by system 500 automatically tests that glimpse is independent from the language and the style of the corpus as well as from the desired concept extraction type. The concept of a "synthetic user" is used for evaluating human-in-the-loop performance. The synthetic user "knows" all the answers (i.e., all the items belonging to the target concept) but does not share them a priori. Clearly, concept instances which are not in the corpus cannot be discovered. To define the synthetic, an established dictionary in the domain is used and a subset of it is determined which has mentions in the corpus—the oracle. The processing provided by system 500 then works as before, however it is not a human who accepts or rejects proposed candidates but the synthetic user, who only accepts terms in its oracle.

In one embodiment, each item in a multi-language oracle has fairly similar frequencies in the target corpora. As a consequence some otherwise correct terms are not included, therefore some "good" contexts are rejected despite being semantically correct. However since the corpora are parallel this "penalty" is language independent. Testing has shown that the concept discovery growth using glimpse is nearly identical for all languages. Furthermore, glimpseLD, which uses knowledge from Linked Data to bootstrap the glimpse processing, is seeded with initial seed terms of the same type as the target concept from Linked Data. In one embodiment, increasing the number of initial and relevant seed terms significantly improves the effectiveness and efficiency of glimpse (i.e., providing for extraction of a higher number of terms in the corpus in fewer human iterations). It is worth noting that retrieving relevant seeds from Linked Data may be performed in several ways. For example, starting with a handful of user-defined seeds and searching for similar items in Linked Data, or letting the user explore the ontology model, etc. There are many tools and approaches that can be used for linking string terms to a given Linked Data dataset, such as the DBpedia Spot-light tool, or pattern-based and label-based approaches. Furthermore, Linked Data is rich with multilingual semantic resources, which can be exploited for the multilingual settings of glimpseLD. For one example, the set of relevant types is identified, a query for all their instances and extraction of their labels in the user defined language(s) are used as seed terms.

In one embodiment, the language independent capabilities of glimpse are shown. Parallel corpora are used in one example in the medical domain, with the task of creating a dictionary of drugs. In another example, the performance of glimpseLD on the same parallel corpora is described below: Linked Data is used to seed the discovery (instead of manual seeds) and an evaluation of how fast processing converges to a desired dictionary for each of the considered languages. In another example, a true human-in-the-loop process is used to quantify, given a concept, how many new instances can be discovered, i.e. how glimpseLD may be used to assist the task of concept (or dictionary) expansion and maintenance. Additionally, glimpseLD is shown to also be robust independently of the style of writing. For this purpose a corpus of tweets is used in several languages and glimpseLD is used to construct a dictionary of color names. In one example, "color" is used as concept as it is a simple enough domain for which native speakers of the different languages may be recruited for the human-in-the-loop example. In all the examples the performance is evaluated with the discovery growth, i.e. at each iteration quantification of how many new instances are added to the dictionary, relative to the initial number of seeds. While accuracy can be calculated in the presence of a gold standard, the discovery growth is a useful indication of performance in a real scenario, where no gold standard is available, but correctness of extraction is assured by human-in-the-loop.

The following description provides details about all the datasets that are used along with the example settings. In one example, a European Medicines Evaluation Agency (EMEA) dataset documents is a parallel corpus comprised of PDF documents from the European Medicines Agency (EMA), related to medicinal products and their translations into 22 official languages of the European Union. The documents have been sentence aligned. The strength of the EMEA corpus is that it is a nearly parallel corpus in many languages. The reason the term "nearly" is used is that not all documents are there in all languages. However, a desire is that the statistical properties of the terms which the processing in system 500 is supposed to find are very similar. Note that for some semantic classes some languages use two words (e.g., blood pressure in English) versus a single word (e.g., Blutdruck in German)—so the frequency of the word blood/Blut would be quite different in both languages even when they are translated word for word. The English, Spanish, Italian and German portion of the dataset are selected and used for the task of constructing a dictionary of drugs in the various languages. This parallel dataset has been selected with the aim of creating a "clean testing environment" and effectively obtain a gold standard, but it is worth specifying that the technique is not bound to existence of such resources.

TWITTER® is one of the most popular microblogging platforms on the Web and provides a huge collection of brief user generated text updates (tweets). Given the personal nature of the content and limited size of each message (e.g., max 140 characters), the text style usually does not follow strict grammatical rules and is often cryptic and chaotic. Although the majority of tweets are in English, tweets in many different languages are also available. A collection of tweets is built in one example in 4 target languages and the processing of system 500 is tasked to extract a dictionary from all of them. In one example, "colors" is chosen as a simple concept to extract. A collection of tweets in an example period, such as between the 1st and the 14th of January 2016, written in English, German, Spanish and Italian language is provided, which contain at least one mention of a color in the respective language (both WIKIDATA® and DBpedia as gold standard lists of colors to select the tweets are used)—this is to create a manageable size collection and to re-create a somehow "focused" corpus. In one example, given that some languages (English in particular) have many more tweets than others, the size of the datasets in different languages is made sure to be balanced: tweets are processed one day at a time and all language chunks are downsized to the number of tweets in the smallest collection, randomly selecting the tweets in the bigger languages. In one example, the final dataset contains 155,828 tweets per language.

In one embodiment, the concept of the "synthetic user", i.e. an oracle acting as human-in-the-loop provides for exhaustive exploration of the impact of changes to the system 500 without requiring very large human user studies. Several synthetic users are built: for the drug extraction scenario examples both with (i) RxNorm, a standard drug dataset and (ii) drug collections obtained from Linked Data (DBpedia and WIKIDATA®). While with RxNorm only an English oracle may be built, with Linked Data oracles in all the target languages are obtained. For the example using TWITTER®, given the semantic simplicity of the domain, a true human-in-the-loop evaluation is performed for all languages.

In one example, a multilingual drug name extraction with a synthetic user is performed by the system 500 processing. The EMEA corpus is used and glimpse is executed with a synthetic user. As a synthetic user for this example, a gold standard dataset of drugs is built using RxNorm, a resource providing normalized names for clinical drugs and links its names to many of the drug vocabularies commonly used in pharmacy management and drug interaction software. As RxNorm is a dataset in English, from the full list of drugs only those that appear in the EMEA corpus in all the four selected languages is used. This amounts to 363 terms that are the same (and have the same distribution) in all languages, but of course their occurrence patterns are language dependent. The following example uses two parallel sentences from the EMEA corpus—one in English and one in Italian—and the occurrence of the term "pravastatin" in the two different languages is illustrated. While the target term is the same, its context is highly language dependent: Plasma elimination half-life of oral pravastatin is 1.5 to 2 hours. L'emivita plasmatica di eliminazione del pravastatin orale é compresa tra un'ora e mezzo e due ore.

Figure 6:
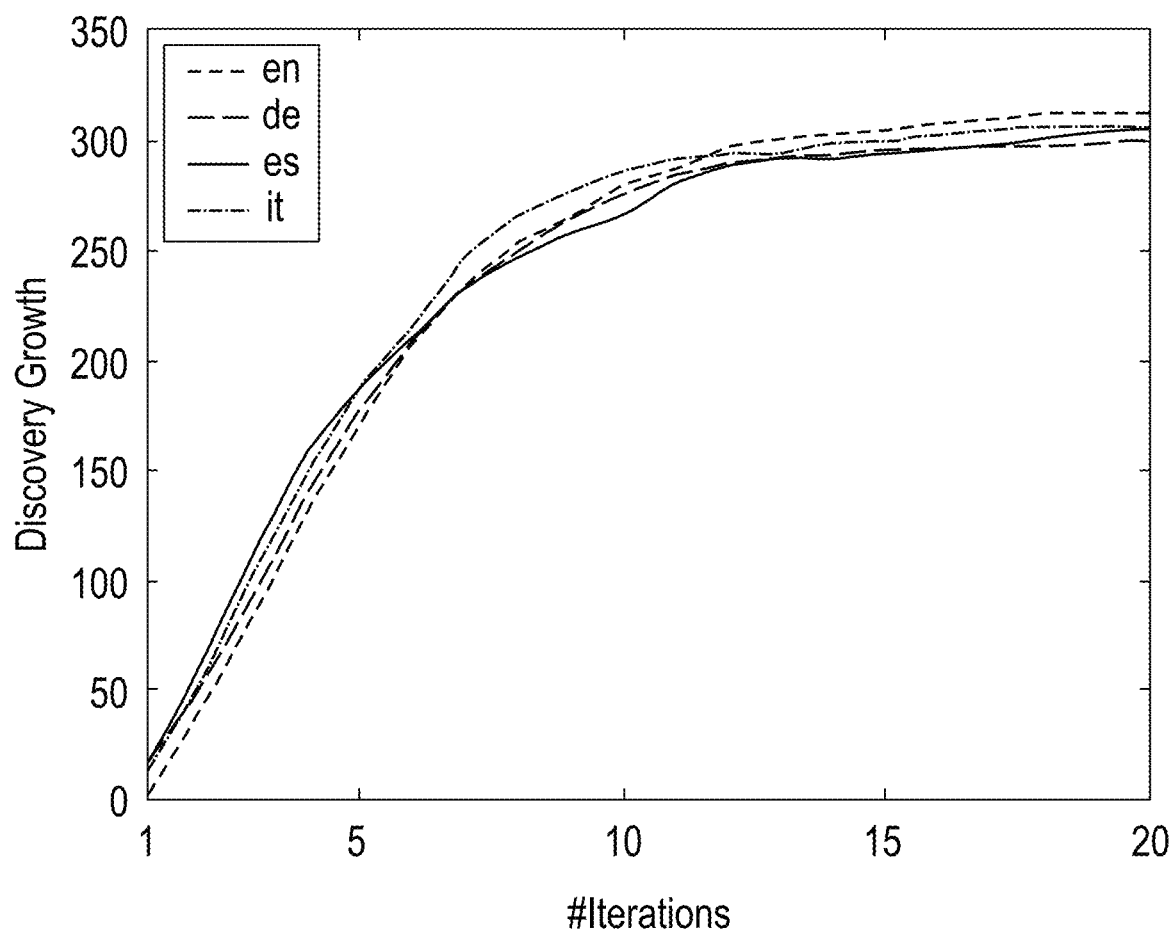
FIG. 6 shows a graph illustrating the discovery growth in a European Medicines Evaluation Agency (EMEA) corpus for four sample languages, using a synthetic user defined utilizing RxNorm, according to one embodiment.
Figure 7A:
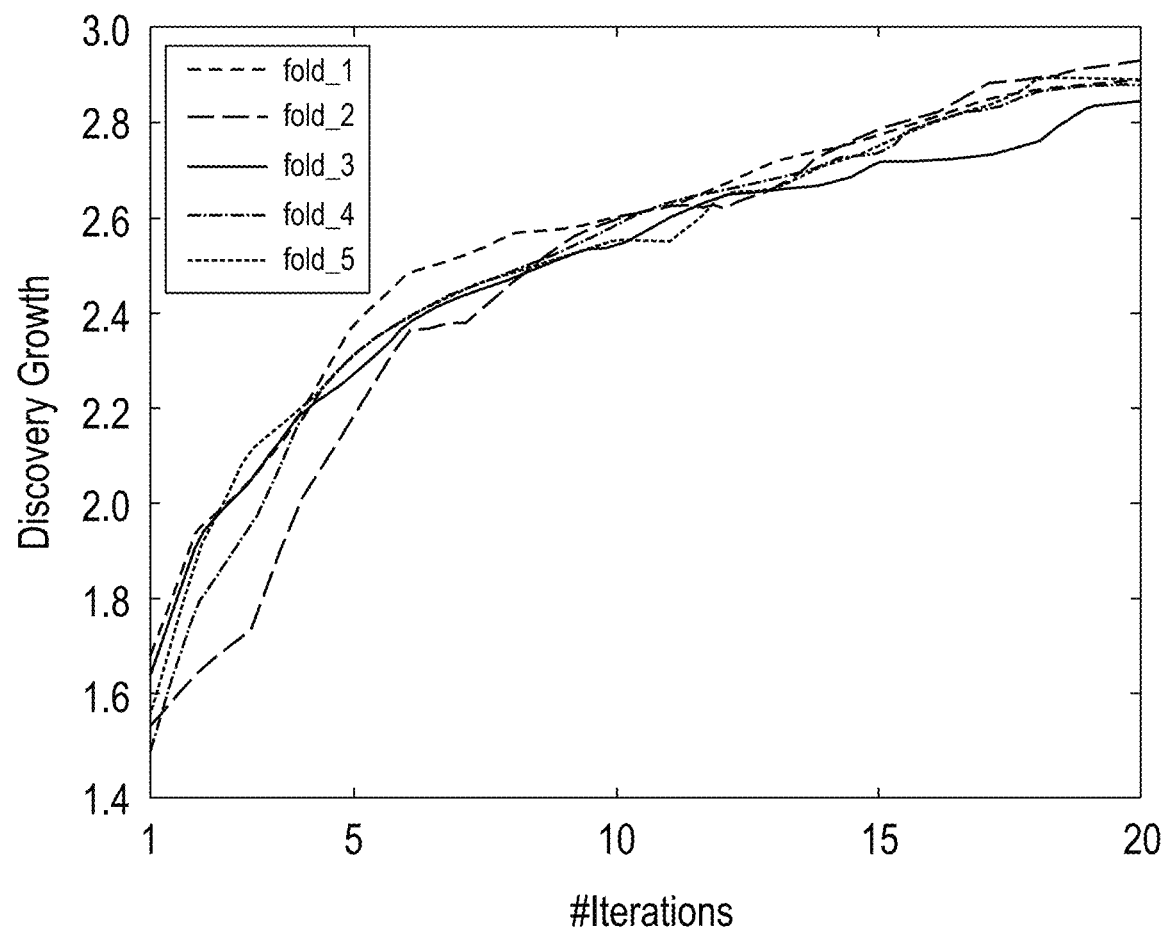
FIGS. 7A-D show graphs illustrating discovery growth for glimpseLD (with 5-fold cross validation) on the EMEA dataset using DBpedia as seeds; each plot (7A for English, 7B for German, 7C for Spanish and 7D for Italian) shows the discovery growth for each of the randomly generated 5 folds and reports the Pearson correlation (r) amongst them, according to one embodiment.
Figure 7B:
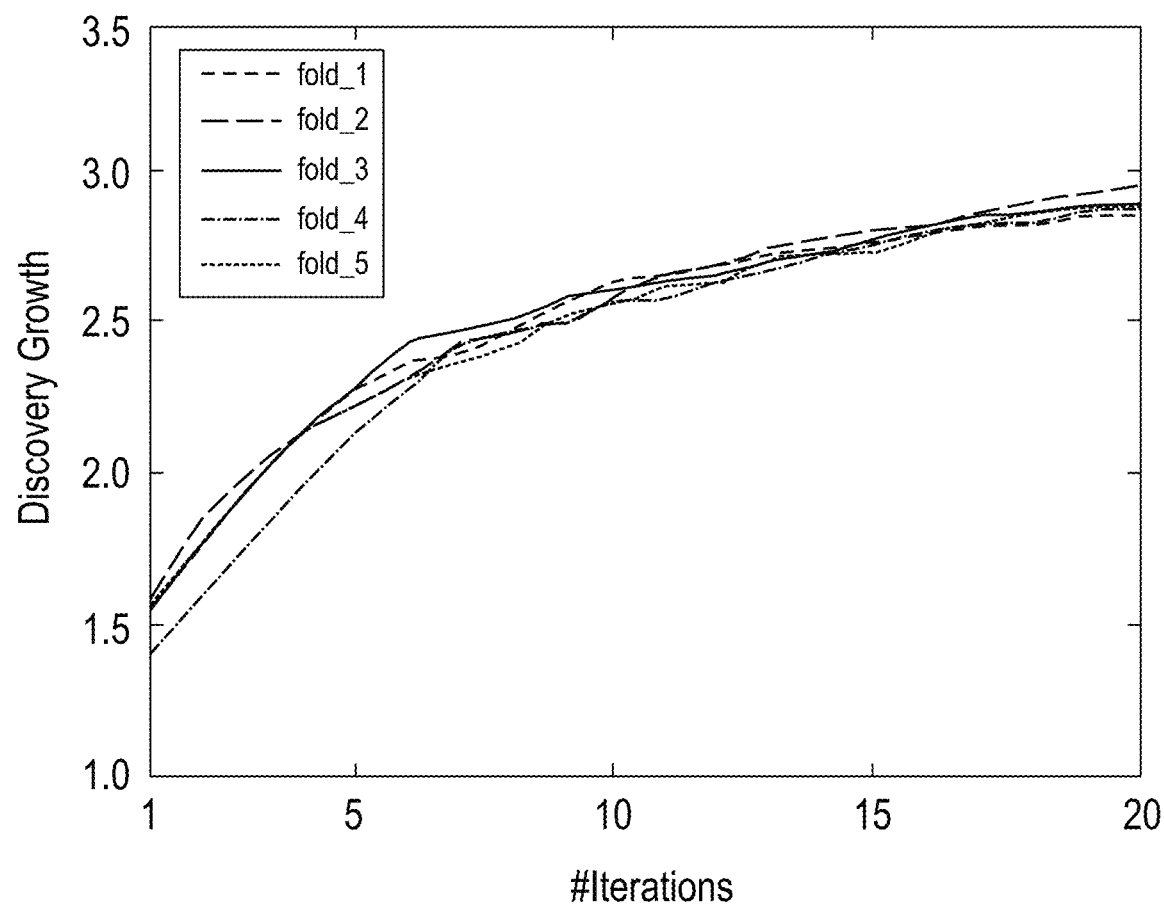
Figure 7C:
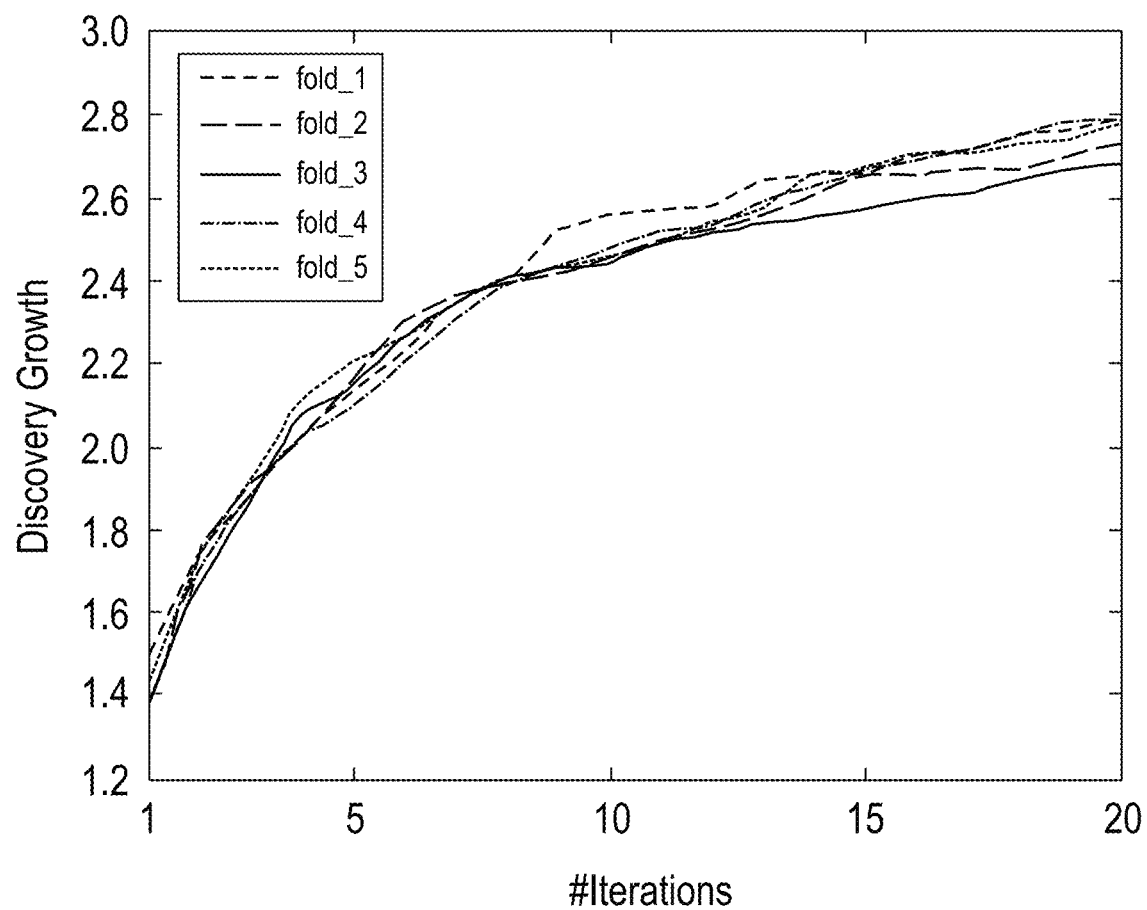
Figure 7D:
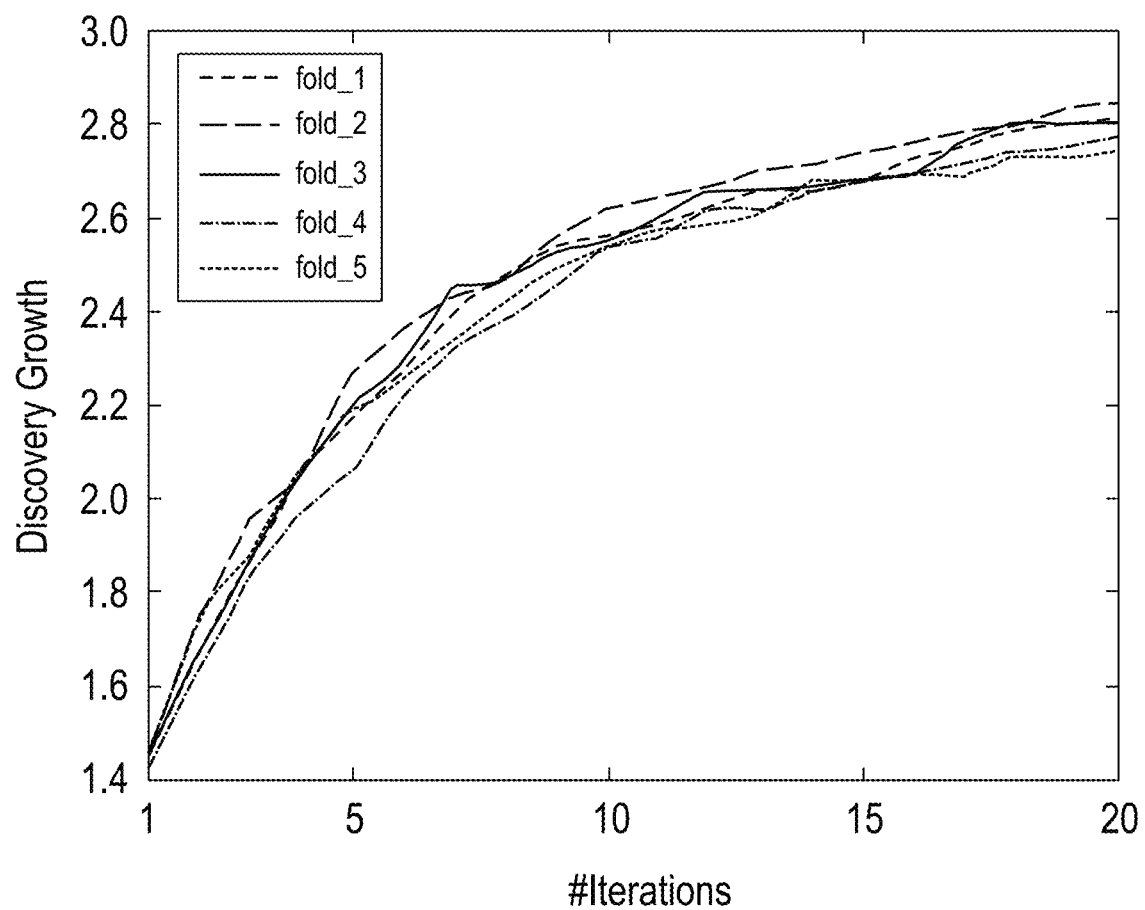
Figure 8A:
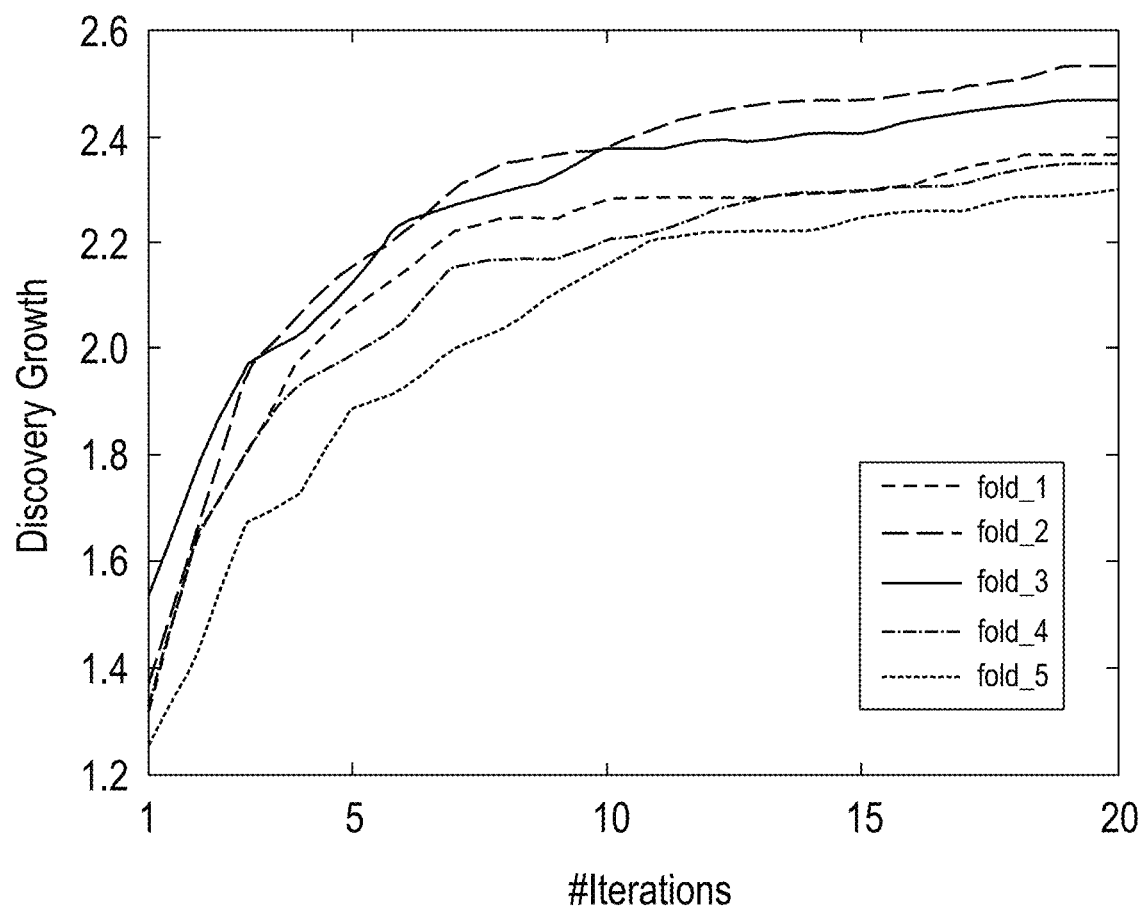
FIGS. 8A-D show graphs illustrating discovery growth for glimpseLD (with 5-fold cross validation) on the EMEA dataset using WIKIDATA® as seeds; each plot (8A for English, 8B for German, 8C for Spanish and 8D for Italian) shows the discovery growth for each of the randomly generated 5 folds and reports the Pearson correlation (r) amongst them, according to one embodiment.
Figure 8B:
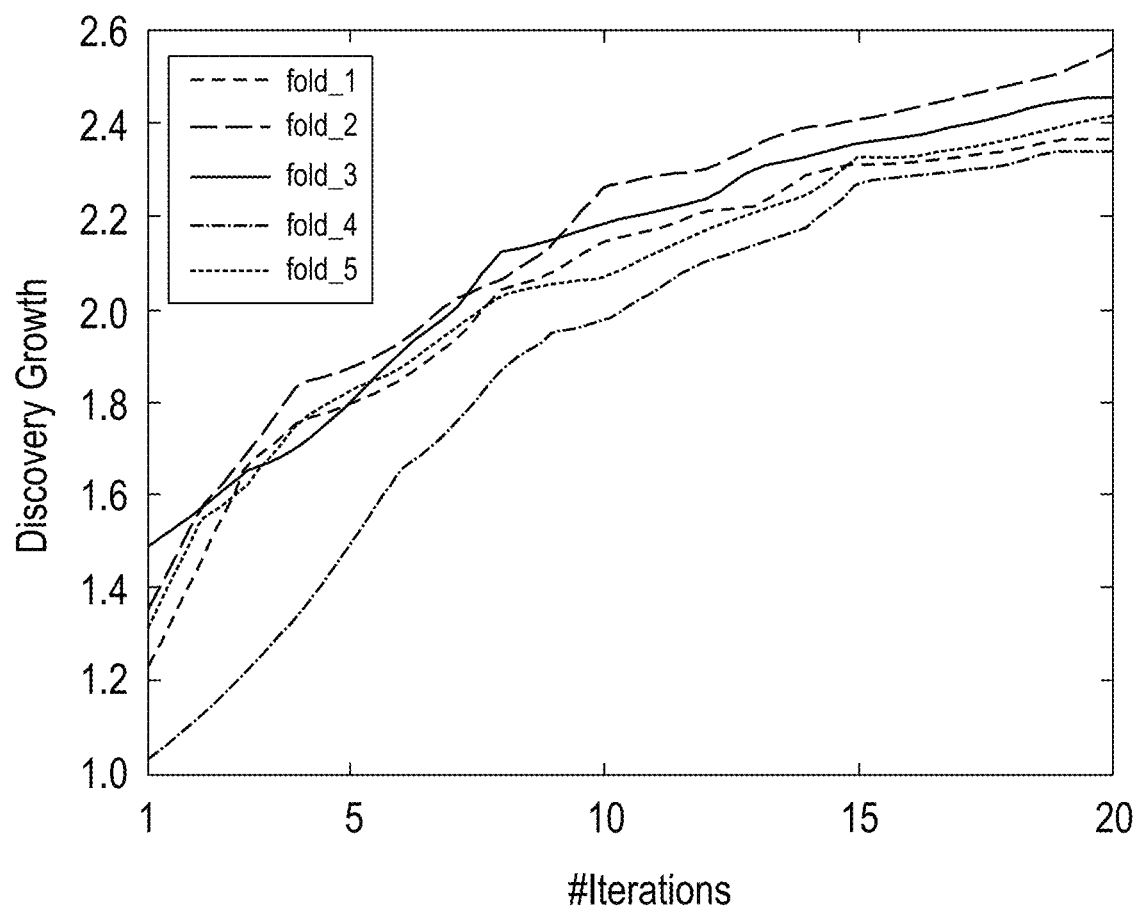
Figure 8C:
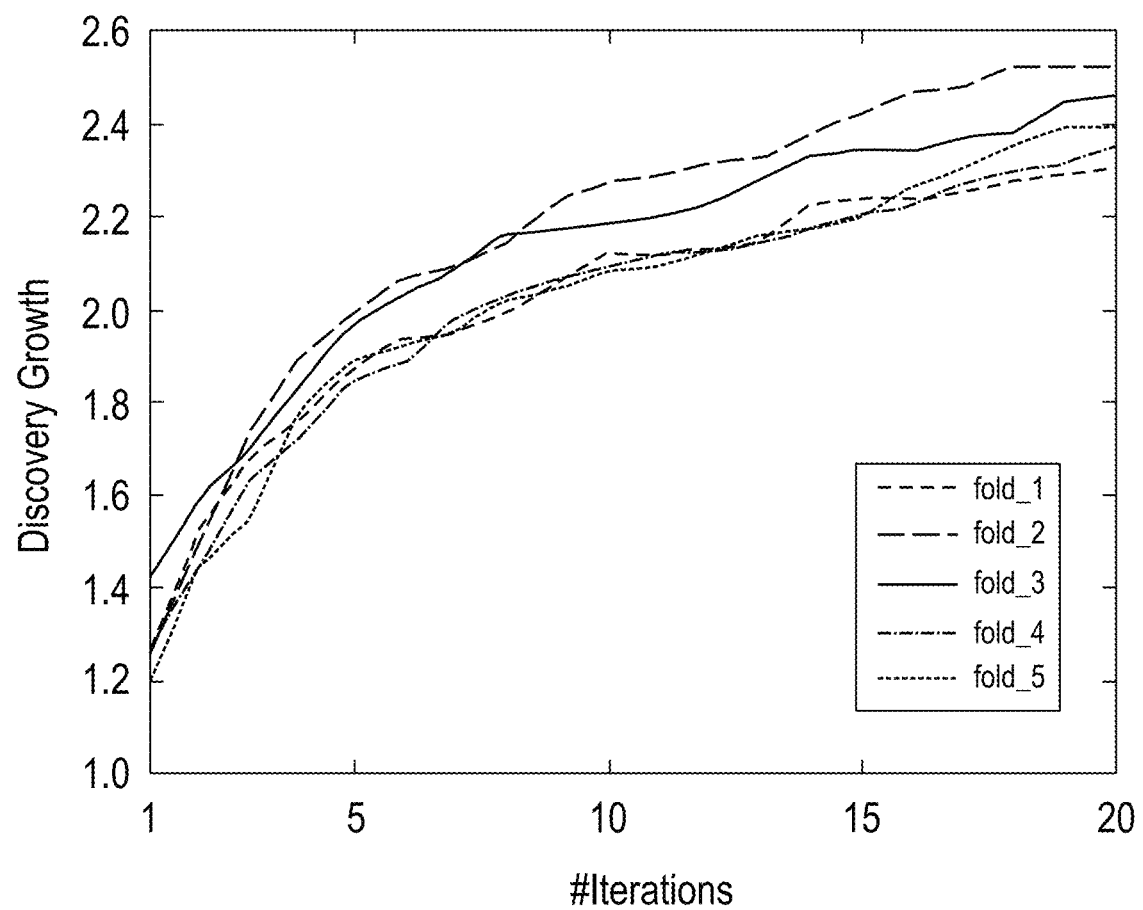
Figure 8D:
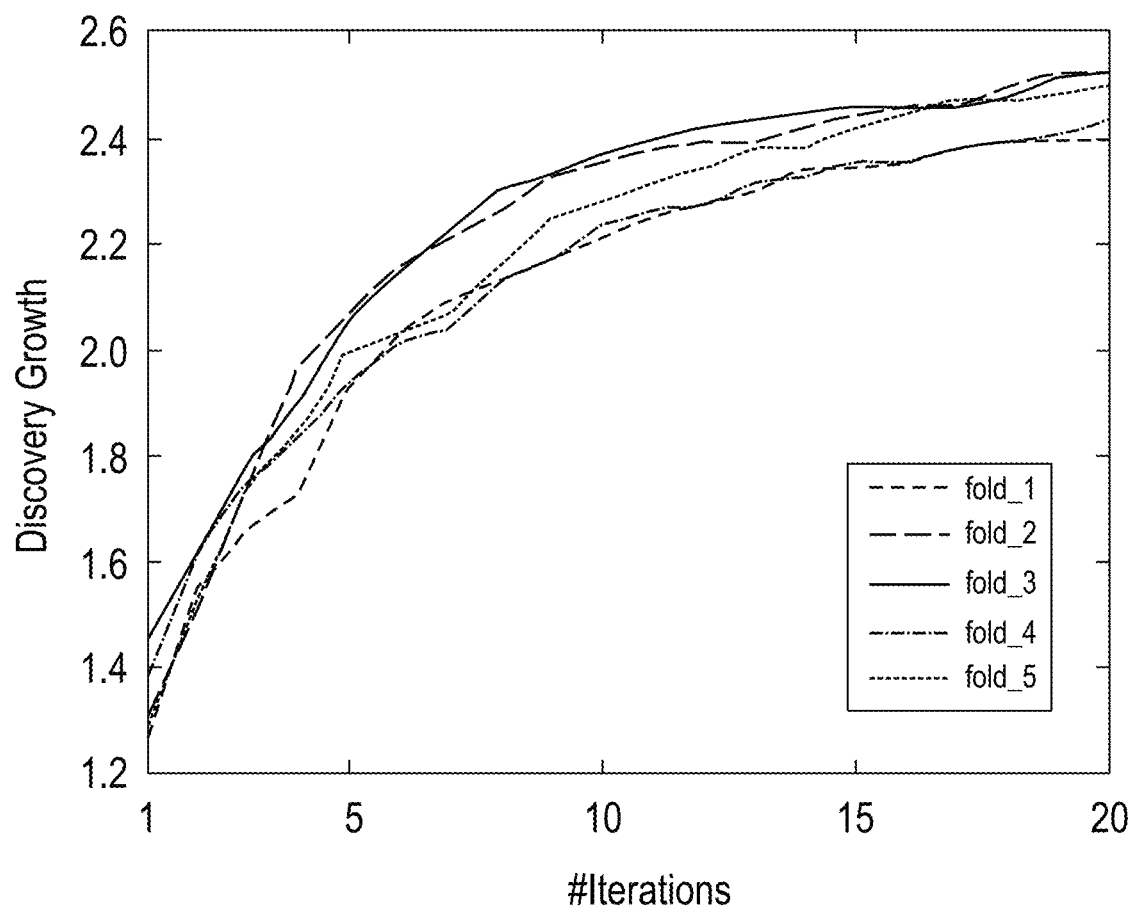

FIG. 6 shows a graph illustrating the discovery growth in an EMEA corpus for four sample languages, using a synthetic user defined utilizing RxNorm, according to one embodiment. Starting with one seed only in each language (en-English, de-German, es-Spanish and it-Italian) (in this example the drug irbesartan was used), the behavior of glimpse is homogeneous in each language, with similar concept growth at each iteration. The average Pearson correlation (r) amongst the results in all languages is above 0.99.

FIGS. 7A-D show graphs illustrating discovery growth for glimpseLD (with 5-fold cross validation) on the EMEA dataset using DBpedia as seeds; each plot (FIG. 7A for English, FIG. 7B for German, FIG. 7C for Spanish and FIG. 7D for Italian) shows the discovery growth for each of the randomly generated 5 folds and reports the Pearson correlation (r) amongst them, according to one embodiment. FIGS. 8A-D show graphs illustrating discovery growth for glimpseLD (with 5-fold cross validation) on the EMEA dataset using WIKIDATA® as seeds; each plot (FIG. 8A for English, FIG. 8B for German, FIG. 8C for Spanish and FIG. 8D for Italian) shows the discovery growth for each of the randomly generated 5 folds and reports the Pearson correlation (r) amongst them, according to one embodiment. In one example, a synthetic user is built by crawling relevant Linked Data in all target languages, making sure the same drugs are covered in all languages. Particularly, two of the biggest cross-domain Linked Open Data (LOD) datasets, DBpedia and WIKIDATA® are used. All the entities of type dbo:Drug11 are selected from DBpedia and all the entities of type WIKIDATA®:Q11173 are selected from WIKIDATA®. For all of the selected entities, the corresponding labels are retrieved in English, German, Spanish and Italian and this is considered the gold standard dictionary. A selection of 20% of this gold standard as seeds is made from each of the languages and the performance of recreating the remaining 80% by using glimpseLD is measured. A 5-fold cross validation is performed without repetition and a random selection of 20% of seeds at each iteration is made (making sure that the seeds represent the same drugs for all 4 languages), to test if the choice of initial seeds impacts the results. FIGS. 7A-D and FIGS. 8A-D show that the processing from system 500 has the same behavior, independently of the selection of seeds, respectively using DBpedia or WIKIDATA® as the gold standard for the four languages.

Figure 9A:
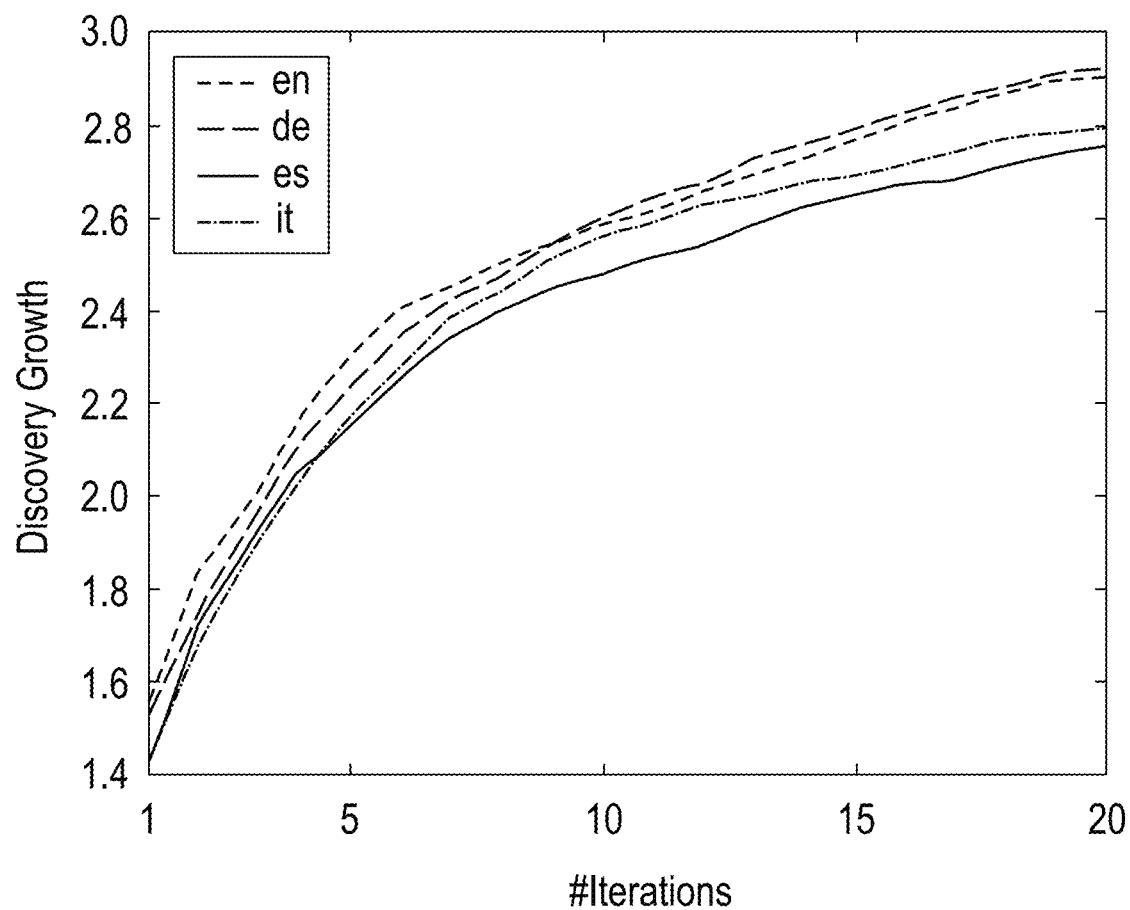
FIGS. 9A-B show graphs illustrating comparison of discovery growth for glimpseLD across different languages on the EMEA dataset, using seeds from DBpedia (FIG. 9A) and WIKIDATA® (FIG. 9B), and the Pearson correlation (r) amongst results from different languages, according to one embodiment.
Figure 9B:
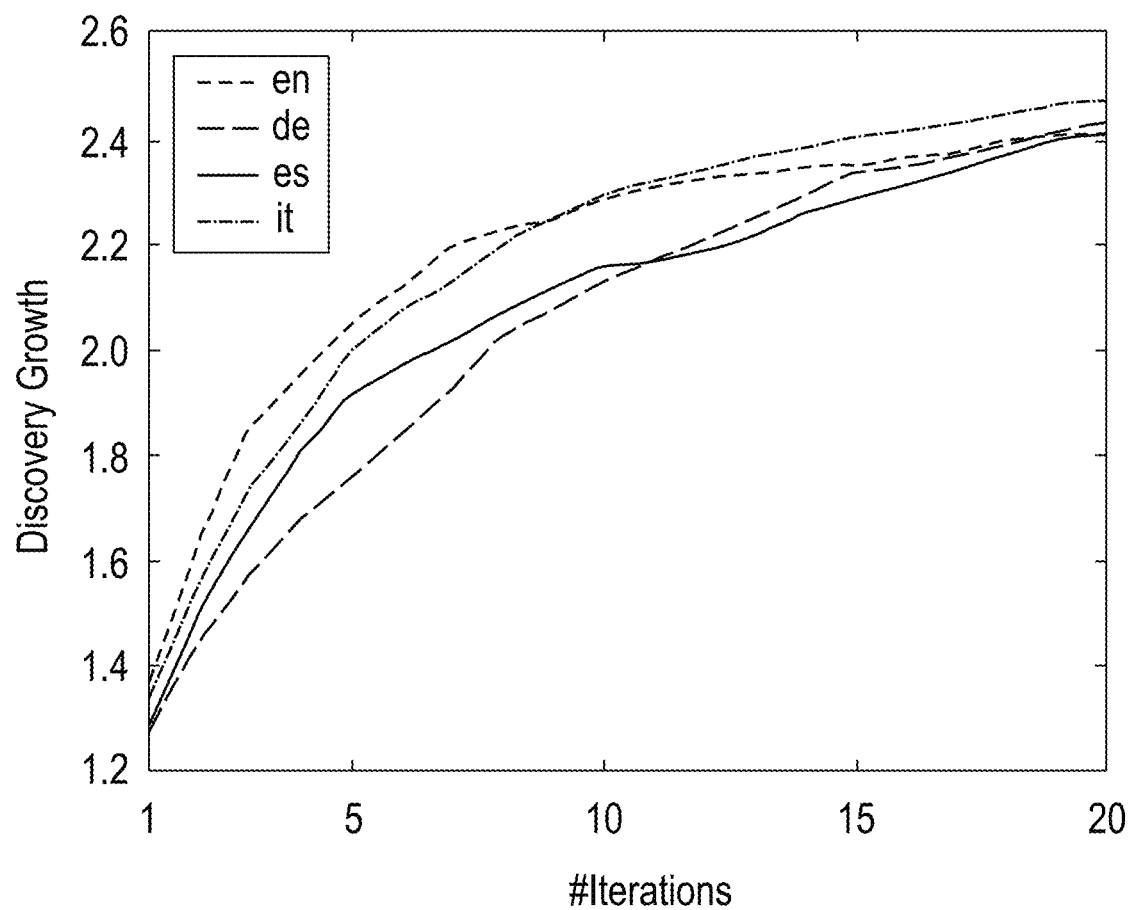

FIGS. 9A-B show graphs illustrating comparison of discovery growth for glimpseLD across different languages on the EMEA dataset, using seeds from DBpedia (FIG. 9A) and WIKIDATA® (FIG. 9B), and the Pearson correlation (r) amongst results from different languages, according to one embodiment. FIGS. 9A-B show the average of the 5-fold processing example for each language in a single plot. The discovery growth is comparable for all languages, with correlation always above 0.98.

Figure 10A:
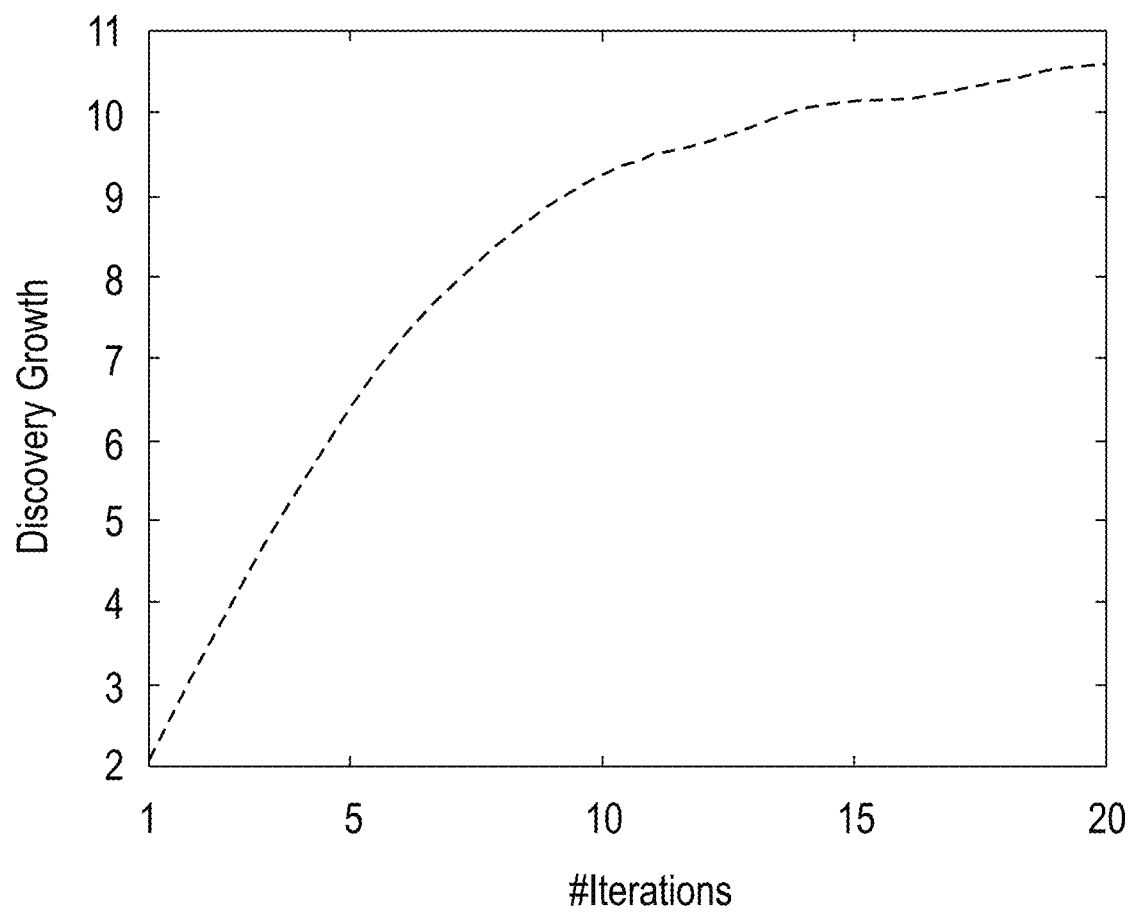
FIGS. 10A-B show graphs illustrating Human-in-the-loop with a subject matter expert (physician) (FIG. 10A shows the discovery growth of glimpseLD, seeded with Linked Data.
Figure 10B:
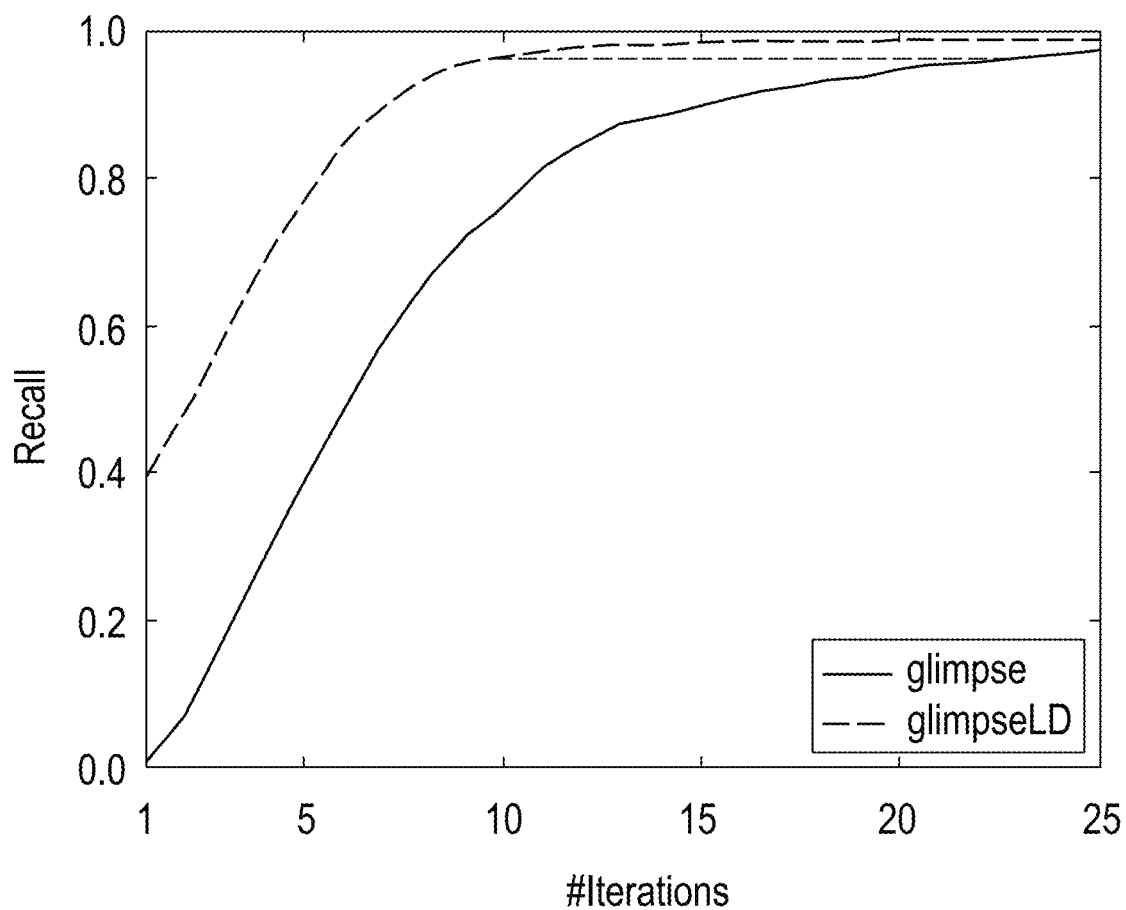

FIGS. 10A-B show graphs illustrating human-in-the-loop with a subject matter expert (physician) (FIG. 10A shows the discovery growth of glimpseLD, seeded with Linked Data; FIG. 10B shows the comparison of recall between glimpse (completely manually seeded) and glimpseLD (Linked Data seeded)), according to one embodiment. One desire is to quantify the benefit of using glimpseLD for enriching Linked Data, i.e. given an existing Linked Dataset how much can be added by running glimpseLD over a relevant corpus to extract new terms. In one example, a random 20% of available Linked Data is used as seeds, the same as in the previous examples, and glimpseLD is executed on the English documents in the EMEA domain, involving a medical doctor as human-in-the-loop (English is only used as it is the native language of the subject expert). With the synthetic user glimpseLD is tested against the already available Linked Data, therefore drugs which are not already there do not get counted as correct. With the human adjudicating those as correct, not only can the true performance of glimpseLD be evaluated, but also the portion of new terms that are able to added to Linked Data is quantified. FIG. 10A shows the discovery growth: in 20 iterations—that only took 57 minutes—a dictionary is obtained that is 10 times bigger than the initial seeds. Using the dictionary produced in this example processing as the gold standard, a close approximation of the recall of both glimpse and glimpseLD is obtained. FIG. 10B shows the comparison of the two methods: glimpse starts with one manually provided seed, glimpseLD with Linked Data seeds. In 10 iterations glimpseLD can cover the same instances that would take more than 20 iterations with glimpse. Moreover, the produced terms are checked against all items already available in DBpedia and WIKIPEDIA®. By using the processing to expand Linked Data an extended coverage of 8.16% is achieved on DBpedia and 0.36% on WIKIDATA®. Although the figure for WIKIDATA® seems small, WIKIDATA® already contains 156,633 different lexicalisations of drugs, yet the subject expert identified some relevant drugs and drug classes in the corpus (specifically 561) which are not yet in the Linked Data.

In one embodiment, using the same methodology as before, seeds were collected from Linked Data. All the entities of type dbo:Colour are selected from DBpedia, and all the entities of type WIKIDATA®:Q1075 from WIKIDATA®. For all of the selected entities, the corresponding labels are retrieved in English, German, Spanish and Italian. Processing is run with 4 native speakers. The example processing was run simultaneously with all participants in the same room so that if anyone had doubts or concerns on accepting/rejecting an item could discuss with other participants. The users were instructed to stop after 10 iterations. It is interesting to notice that despite seeding glimpseLD with all available colors on DBpedia and WIKIDATA®, processing was still able to find additional colors, e.g., "azulgrana" or "rojo vivo" for Spanish as well as capturing the occurrence of shortened lexicalisation for certain colors, such as "limn" in place of the color "limon." In total, 19 new colors were found for English, 22 for Spanish, 5 for German and Italian, respectively. In the example processing, these human-created dictionaries were used as gold standards to perform a further synthetic test, starting with one seed (the color red in all languages)—as processing is using a manually created gold standard, this is the equivalent to re-running the test with the users. For all languages, the number of iterations required to get to the same size lexicon was at least double with respect to starting with Linked Data seeds.

A comparison of the number of identified lexicon terms using glimpseLD is made with a synthetic user, glimpse with human-in-the-loop and DBpedia Spotlight. The results are shown in Table I for the EMEA dataset and Table II for the TWITTER® dataset. In both cases and for all the languages, glimpseLD with human-in-the-loop is able to identify the highest number of lexicon terms. Furthermore, when looking at languages other than English, glimpseLD outperforms DBpedia Spotlight on both datasets. It is argued that this is an important result, as information extraction methods, especially when targeting user-generated data, have traditionally focused on English, while adaptation to new languages still remains an open issue. It is worth noting that a standard named entity recognition (NER) tool might fail with arbitrary types (e.g., Color). A machine reader for extracting RDF graphs that are linked to LOD and compliant to semantic Web and Linked Data patterns (i.e., FRED) tries to link words to external knowledge and identifies concepts such as White_House, Black_Lives_Matter etc., which for the particular task (identifying instances of Color) does not fit.

TABLE I

|         | gLD-S | gLD-H | DBSpot. |
|---------|-------|-------|---------|
| English | 248   | 822   | 352     |
| German  | 257   | /     | 234     |
| Spanish | 239   | /     | 109     |
| Italian | 247   | /     | 184     |

TABLE II

|         | gLD-S | gLD-H | DBSpot. | Babelfy | FRED |
|---------|-------|-------|---------|---------|------|
| English | 21    | 54    | 13      | 27      | 0    |
| German  | 18    | 32    | 6       | 14      | 0    |
| Spanish | 23    | 43    | 12      | 22      | 0    |
| Italian | 18    | 36    | 8       | 17      | 0    |

The world is an inherently multicultural and multilingual place, where different countries and regions develop their own unique technologies, social concepts, fashion language, etc., at an astounding rate. Developing semantic assets (dictionaries, taxonomies, etc.) in all these languages allows detection and interconnection of concepts between these cultures, opening the door for even more rapid discovery. Even within a single language, cultural and technological terms develop and evolve staggeringly quickly. As usual, it is these very new terms that are of most interest for inclusion in semantic assets and Linked Data resources. The described embodiments address the challenge by proposing a solution to discover new instances for a specific ontology concept for an which is independent of (i) language, (ii) domain and (iii) text style. The glimpseLD processing is iterative and statistical, hence does not require any feature extraction which can be difficult and "expensive" in terms of processing bandwidth and memory usage in different languages and texts. It organically incorporates human feedback to improve accuracy and control concept drift at every iteration cycle. Additionally, the examples were run as required to quantify this due to the usage of an oracle to determine the growth rate for adding instances automatically. It is shown that extremely similar discovery growth (of over 250) extracting drug names on four languages over parallel corpora of medical text, with minimal variation from initial seeds. It is shown that similar efficacy for a second entity type (color) over non-parallel microblogging corpora. Exploiting Linked Data in the bootstrapping phase maintains the same comparable performances in all languages, speeding up the hurdle of initial iterations. Lastly, due to the tight integration of the human-in-the-loop the very high quality instances (their surface forms) developed by the embodiments can be included rapidly and directly back into the Linked Data.

Figure 11:
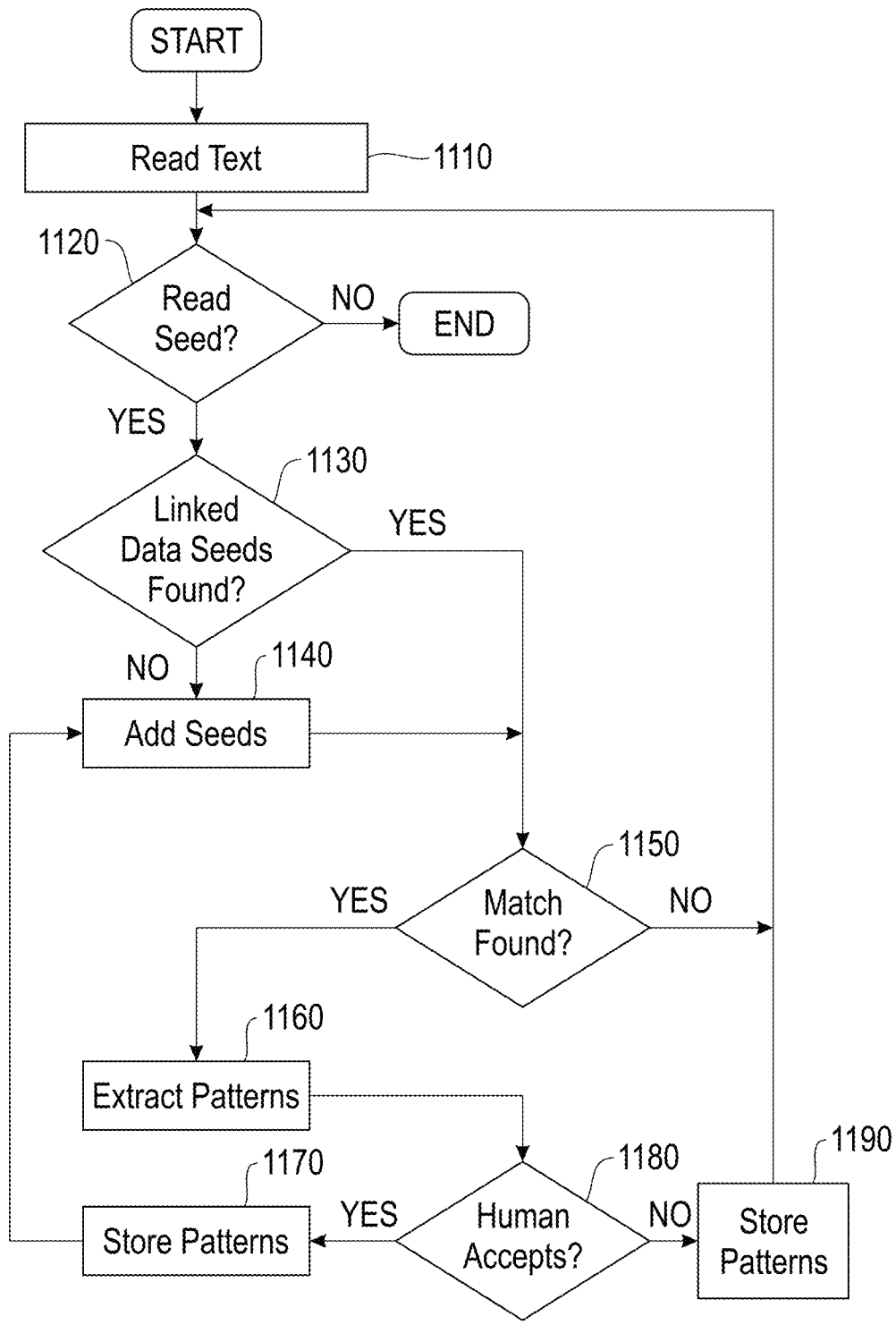
FIG. 11 illustrates a flow for using Linked Data to seed a multi-lingual lexicon extraction process, according to one embodiment.

FIG. 11 illustrates a flow 1100 for using Linked Data to seed a multi-lingual lexicon extraction process, according to one embodiment. In one embodiment, in block 1110, process 1100 reads text from the input. In one embodiment, the input may include content, such as unstructured text content and semi-structured text content, a text corpus including content that is relevant to a domain of a concept to be extracted, etc. In block 1120, it is determined whether a seed is read from the input or not. If no seed was read, process 1100 ends. Otherwise, process 1100 proceeds to block 1130. In block 1130, it is determined whether Linked Data seeds were found from the input. In one embodiment, initial seed terms may include a same type of terms as a target concept from Linked Data. If no Linked Data seeds were found in block 1130, process 1100 proceeds to block 1140 to add seed terms and proceed to block 1150. If Linked Seeds were found, process 1100 proceeds to block 1150. In block 1150, process 1100 determines whether a match (using context extraction patterns and statistical processing) is found using the Linked Data seeds. If a match is found, process 1100 proceeds to block 1160 where the patterns are extracted and process 1100 proceeds to block 1180. Otherwise, if no match is found, process 1100 proceeds to block 1120. In block 1180, process 1100 determines if feedback from a human (or synthetic human) accepts the extracted patterns or not. If feedback accepting the extracted patterns is received, process 1100 proceeds to block 1170 to store patterns and process 1100 proceeds back to block 1140. Otherwise, process 1100 proceeds to block 1190 where the patterns are rejected. Process 1100 then proceeds back to block 1120.

Figure 12:
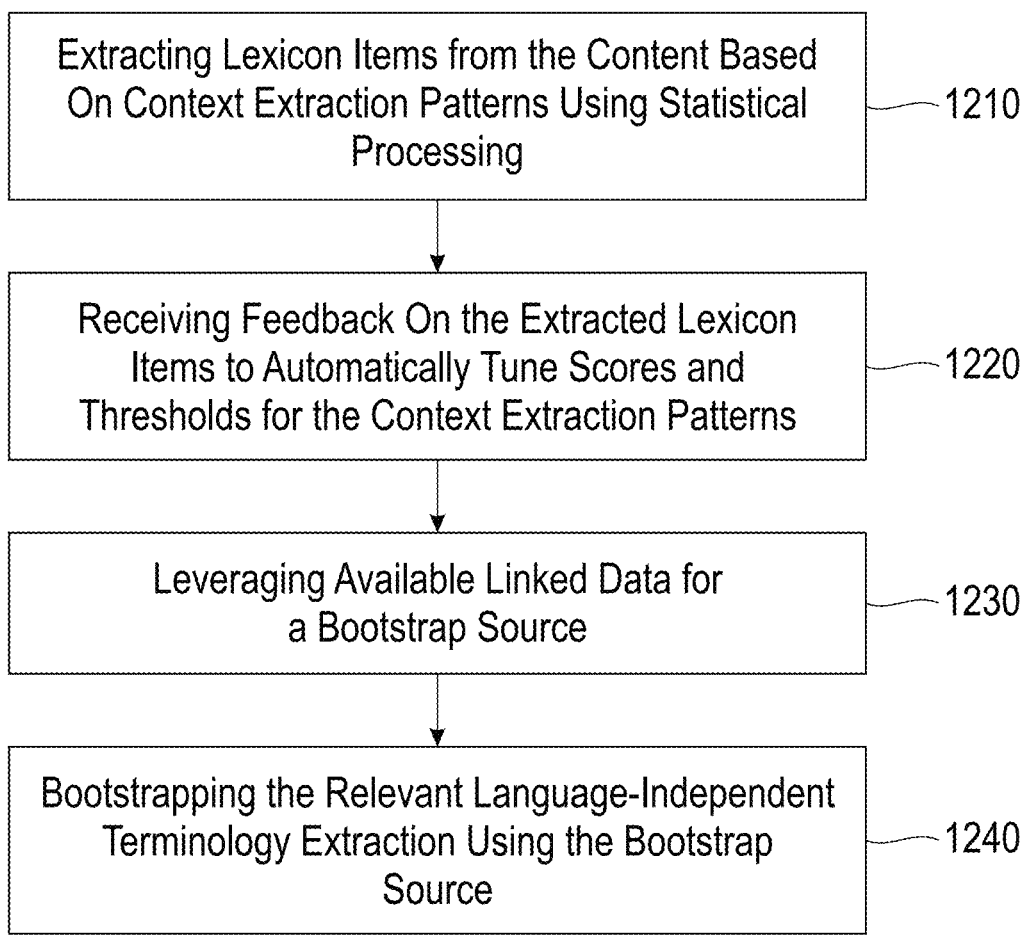
FIG. 12 illustrates a block diagram of a process for relevant language-independent terminology extraction from content, according to one embodiment.

FIG. 12 illustrates a block diagram of a process 1200 for relevant language-independent terminology extraction from content, according to one embodiment. In one embodiment, in block 1210 process 1200 extracts lexicon items from the content based on context extraction patterns using statistical processing (e.g., using a hardware processor from cloud computing environment 50, FIG. 1, Hardware and software layer 60, FIG. 2, architecture 300, FIG. 3, hardware system 400, FIG. 4, system 500, FIG. 5, etc.). In block 1220, process 1200 receives feedback (e.g., from a human-in-the-loop or synthetic user) on the extracted lexicon items to automatically tune scores and thresholds for the context extraction patterns. Block 1230 provides for leveraging available Linked Data for a bootstrap source. In block 1240, process 1200 bootstraps the relevant language-independent terminology extraction using the bootstrap source.

In one embodiment, in process 1200 the content comprises unstructured content and semi-structured content. In one embodiment, the unstructured content and semi-structured content comprise text. Process 1200 may provide that the lexicon items comprise ontological concepts.

In one embodiment, process 1200 may provide that initial seed terms for the statistical processing comprises a same type of terms as a target concept from the Linked Data. Process 1200 may further provide that the content comprises a text corpus including content that is relevant to a domain of a concept to be extracted.

In one embodiment, process 1200 may provide that context of the context extraction patterns comprises a set of words surrounding an item in which seed terms occur. Contexts are scored retrospectively in terms of positive results generated. In one embodiment, all contexts are stored for a score exceeding a threshold. Process 1200 may provide that contexts are used to identify further terms or phrases in a corpus, and the contexts are provided as new concept candidates. In one embodiment, the new concept candidates that are accepted are added to a dictionary and used as additional seeds for a next extraction iteration.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for relevant language-independent terminology extraction from content, the method comprising:
    extracting lexicon items from the content based on context extraction patterns using statistical processing, wherein context of the context extraction patterns comprises a set of words surrounding an item in which seed terms occur, contexts are scored retrospectively in terms of positive results generated, contexts are provided as new concept candidates and the new concept candidates that are accepted are added to a dictionary and used as additional seeds for a next extraction iteration, and the contexts are used to identify further terms or phrases in a corpus;
    receiving feedback on the extracted lexicon items to automatically tune scores and thresholds for the context extraction patterns;
    leveraging available Linked Data for a bootstrap source; and
    bootstrapping the relevant language-independent terminology extraction using the bootstrap source.

2. The method of claim 1, wherein the content comprises unstructured content and semi-structured content.

3. The method of claim 2, wherein the unstructured content and semi-structured content comprise text.

4. The method of claim 2, wherein the lexicon items comprise ontological concepts.

5. The method of claim 1, wherein the feedback source comprises one of a synthetic user and a human-in-the-loop.

6. The method of claim 1, wherein initial seed terms for the statistical processing comprises a same type of terms as a target concept from the Linked Data.

7. The method of claim 1, wherein the content comprises a text corpus including content that is relevant to a domain of a concept to be extracted.

8. The method of claim 1, wherein:
all contexts are stored for a score exceeding a threshold.

9. A computer program product for relevant language-independent terminology extraction from content, the computer program product comprising a non-transitory computer readable storage medium having program instructions embodied therewith, the program instructions executable by a processor to cause the processor to:
extract, by the processor, lexicon items from the content based on context extraction patterns using statistical processing, wherein context of the context extraction patterns comprises a set of words surrounding an item in which seed terms occur, contexts are scored retrospectively in terms of positive results generated, contexts are provided as new concept candidates and the new concept candidates that are accepted are added to a dictionary and used as additional seeds for a next extraction iteration, and the contexts are used to identify further terms or phrases in a corpus;
receive, by the processor, feedback on the extracted lexicon items to automatically tune scores and thresholds for the context extraction patterns;
leveraging, by the processor, available Linked Data for a bootstrap source; and
bootstrap, by the processor, the relevant language-independent terminology extraction using the bootstrap source.

10. The computer program product of claim 9, wherein the content comprises unstructured content and semi-structured content.

11. The computer program product of claim 10, wherein the unstructured content and semi-structured content comprise text.

12. The computer program product of claim 10, wherein the lexicon items comprise ontological concepts.

13. The computer program product of claim 9, wherein the feedback source comprises one of a synthetic user and a human-in-the-loop.

14. The computer program product of claim 9, wherein initial seed terms for the statistical processing comprises a same type of terms as a target concept from the Linked Data, and the content comprises a text corpus including content that is relevant to a domain of a concept to be extracted.

15. The computer program product of claim 9, wherein:
all contexts are stored for a score exceeding a threshold.

16. An apparatus comprising:
a memory configured to store instructions; and
a processor configured to execute the instructions to:
extract lexicon items from content based on context extraction patterns using statistical processing, wherein context of the context extraction patterns comprises a set of words surrounding an item in which seed terms occur, contexts are scored retrospectively in terms of positive results generated, contexts are provided as new concept candidates and the new concept candidates that are accepted are added to a dictionary and used as additional seeds for a next extraction iteration, and contexts are used to identify further terms or phrases in a corpus;
receive feedback on the extracted lexicon items to automatically tune scores and thresholds for the context extraction patterns;
leverage available Linked Data for a bootstrap source; and
bootstrap relevant language-independent terminology extraction using the bootstrap source.

17. The apparatus of claim 16, wherein:
the content comprises unstructured content and semi-structured content;
the unstructured content and semi-structured content comprise text; and
the lexicon items comprise ontological concepts.

18. The apparatus of claim 16, wherein the feedback source comprises one of a synthetic user and a human-in-the-loop.

19. The apparatus of claim 16, wherein initial seed terms for the statistical processing comprises a same type of terms as a target concept from the Linked Data, and the content comprises a text corpus including content that is relevant to a domain of a concept to be extracted.

20. The apparatus of claim 16, wherein:
all contexts are stored for a score exceeding a threshold.

* * * * *